(12) United States Patent
Otsuka

(10) Patent No.: US 7,362,722 B2
(45) Date of Patent: Apr. 22, 2008

(54) RADIO STATION, OPERATION CONTROL PROGRAM, AND OPERATION CONTROL METHOD

(75) Inventor: Naoki Otsuka, Kounan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 92 days.

(21) Appl. No.: 10/930,912

(22) Filed: Sep. 1, 2004

(65) Prior Publication Data

US 2005/0054342 A1 Mar. 10, 2005

(30) Foreign Application Priority Data

Sep. 5, 2003 (JP) ............................. 2003-314333

(51) Int. Cl.
- *H04Q 7/00* (2006.01)
- *H04Q 7/24* (2006.01)
- *H04J 1/10* (2006.01)
- *H04M 1/00* (2006.01)

(52) U.S. Cl. ................... 370/328; 370/315; 370/338; 455/552.1

(58) Field of Classification Search ............... 370/352, 370/353; 455/552.1, 453

See application file for complete search history.

(56) References Cited

U.S. PATENT DOCUMENTS

| | | | |
|---|---|---|---|
| 6,389,010 B1 * | 5/2002 | Kubler et al. ............... | 370/353 |
| 6,614,768 B1 * | 9/2003 | Mahany et al. ............. | 370/328 |
| 2003/0091015 A1 | 5/2003 | Gassho et al. | |
| 2003/0100335 A1 * | 5/2003 | Gassho et al. ............. | 455/552 |
| 2004/0076300 A1 * | 4/2004 | Ishidoshiro ................ | 380/277 |
| 2004/0120301 A1 * | 6/2004 | Kitchin ...................... | 370/345 |

FOREIGN PATENT DOCUMENTS

| | | |
|---|---|---|
| JP | A 2003-143156 | 5/2003 |
| JP | EP 1 309 127 A1 | 5/2003 |
| JP | A-2003-163668 | 6/2003 |
| JP | A-2004-253885 | 9/2004 |

* cited by examiner

Primary Examiner—Rafael Perez-Gutierrez
Assistant Examiner—Mazda Sabouri
(74) Attorney, Agent, or Firm—Oliff & Berridge, PLC

(57) ABSTRACT

A radio station, which is to be connected to a first wireless network through an access point, has an AP storage section that stores network identification information indispensable for grouping subjects of communication in a wireless network, an AP function section that establishes connection with a second wireless network based on the network identification information stored in the AP storage section, a client storage section that stores client identification information used in connecting to the first wireless network, a client function section that establishes connection with the first wireless network based on the client identification information stored in the client storage section, and an operation control section that simultaneously controls operation of the AP function section and operation of the client function section.

37 Claims, 17 Drawing Sheets

FIG. 10

| | | | | |
|---|---|---|---|---|
| Mode | Infrastructure Mode | | | |
| SSID | DxiiKyt088 | Browse | | |
| Channel | 3 | | | |

| | | | | |
|---|---|---|---|---|
| Authentication | Shared Key | | | |
| User ID | | | | |
| Password | | | | |
| Encryption | WEP | | | |

| | USE | KEY | TYPE | SIZE |
|---|---|---|---|---|
| WEP KEY 1 | ● | 6162636465 | Hexadecimal | 40(64) bits |
| WEP KEY 2 | ○ | abcdefghijklm | ASCII | 104(128) bits |
| WEP KEY 3 | ○ | | Hexadecimal | not set |
| WEP KEY 4 | ○ | | Hexadecimal | not set |

Test b1
OK     Cancel

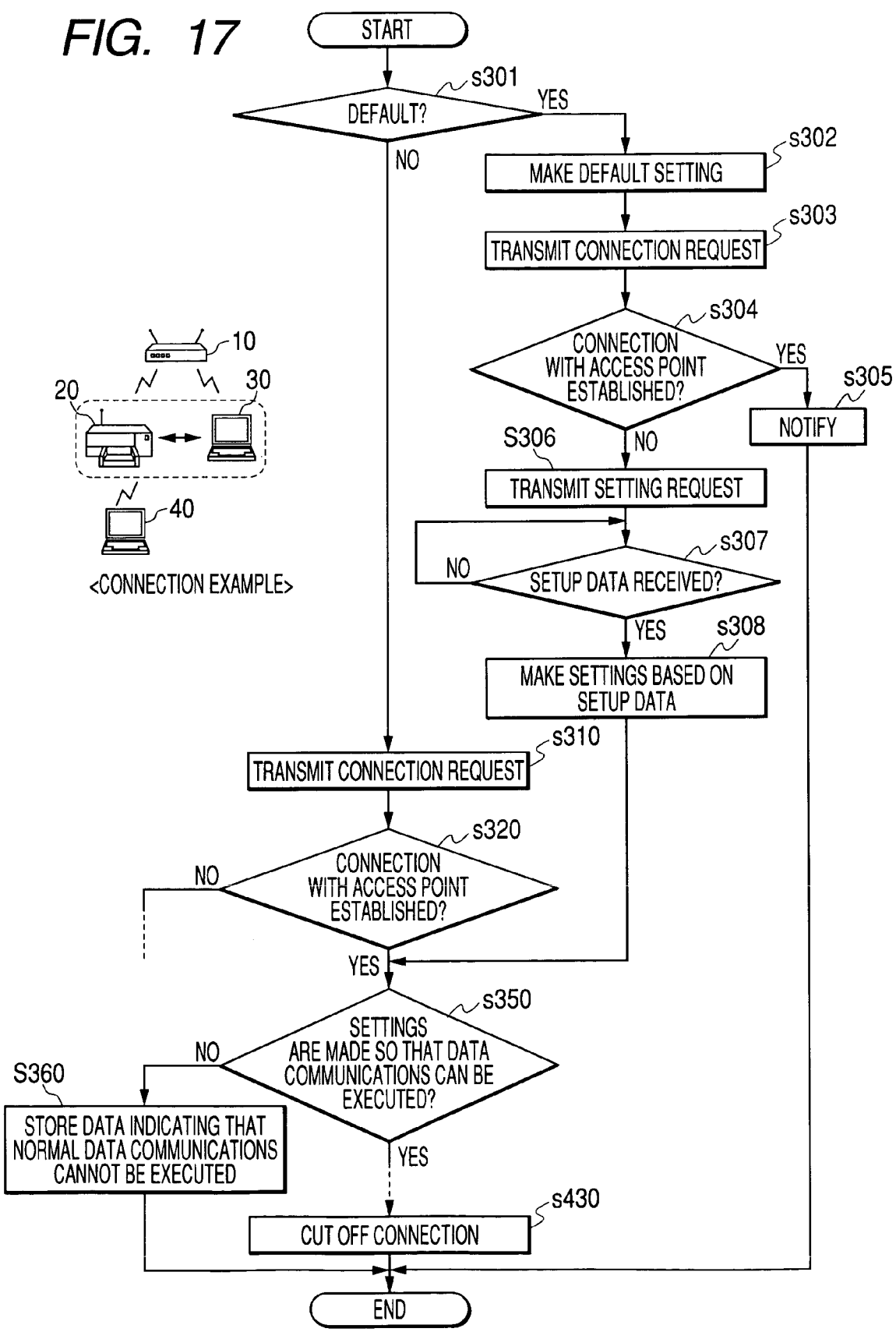

US 7,362,722 B2

RADIO STATION, OPERATION CONTROL PROGRAM, AND OPERATION CONTROL METHOD

BACKGROUND OF THE INVENTION

1. Field of the Invention

The invention relates to a radio station connected to a wireless network where a plurality of communication devices communicate with each other through an access point, and an operation control program and an operation control method that can be used in the radio station.

2. Description of the Related Art

Nowadays, a wireless LAN for realizing data communications by radio between radio stations or between a radio station and an external network becomes widely available.

In a network of a wireless LAN, communication modes such as an "infrastructure mode" for radio stations to conduct radio communications through an access point and an "ad hoc mode" for radio stations to conduct radio communications directly with each other are available, and the communication mode of each radio station can be switched in response to the use of the radio station; generally, the radio stations are used in the "infrastructure mode."

In the network according to the "infrastructure mode," various settings of SSID (Service Set IDentifier or ESSID (Extended SSID)), WEP (Wired Equivalent Privacy) key, etc., are made in each radio station, whereby it is made possible for the radio station to access an access point. When various settings are made in the radio station, if the radio station is provided with an easy-to-use user interface like a personal computer (PC), the user can easily make settings through the user interface.

However, with the radio station having no easy-to-use user interface as compared with the PC, such as a printer for providing services through a network, it is a very cumbersome and time-consuming task for the user to make settings through the user interface.

Thus, in some radio stations, the communication mode is switched into the "ad hoc mode" together with other radio stations and data concerning settings is transferred between the radio stations, whereby the radio station is indirectly set (remotely set up) from another radio station, or the radio station is connected directly to a PC by a cable and data concerning settings is transferred between the radio station and the PC, whereby the radio station can be indirectly set from the PC.

In this case, however, the radio stations with the communication mode switched into the "ad hoc mode" need to be moved so that they are placed in the positional relationship in which radio communications can be conducted, or the PC needs to be moved to a location where a cable can be laid out; after all, remote setup is also a time-consuming job.

Particularly, to remotely set up the radio station used in the "infrastructure mode," the communication mode needs to be again switched into the "infrastructure mode" from the "ad hoc mode" after the remote setup is complete, and therefore the job more consumes the time.

Thus, with the radio station having no easy-to-use user interface as compared with the PC, such as a printer for providing services through a network, it takes much time for the user to make various settings.

Then, in recent years, various arts for decreasing expense in time and effort of such a job have been proposed. For example, one of the arts is as follows: An access point function is added to a network device such as a printer functioning as an access point, a proper wireless network is established by the function (AP function section), and from another radio station connected to the radio station through the wireless network, setting required for connecting to another wireless network (remote setup) is made indirectly by a radio station function (client function section) and then the access point function is stopped. (Refer to JP-A-2003-143156.)

This art makes it possible to decrease expense in time and effort required for making various settings in a radio station having no easy-to-use user interface.

JP-A-2003-143156 is referred to as a related art.

However, after the setting required for connecting to another wireless network is made indirectly in the network device in the art described above by the radio station function, the access point function is stopped.

If the network device can function as an access point (at least can establish communications with another network device) still after the setting required for connecting to another wireless network is made indirectly, it can be expected that the art (network device) will be utilized for uses such that the another radio station conducts radio communications through the wireless network via the network device, that the user is immediately notified whether or not setting for connecting the radio station to another network results in success, etc., for example.

SUMMARY OF THE INVENTION

The object of the invention is to provide a radio station which can function as an access point still after settings required for connection to another wireless network are indirectly made, and an operation control program and an operation control method used in the radio station.

The invention provides a radio station to be connected to a first wireless network through an access point, having: an AP storage section that stores network identification information indispensable for grouping subjects of communication in a wireless network; an AP function section that establishes connection with a second wireless network based on the network identification information stored in the AP storage section; a client storage section that stores client identification information used in connecting to the first wireless network; a client function section that establishes connection with the first wireless network based on the client identification information stored in the client storage section; and an operation control section that simultaneously controls operation of the AP function section and operation of the client function section.

Therefore, the client function section provides the essential function of the radio station for establishing connection with the wireless network provided by a predetermined access point externally provided (access point) and corresponding to the client identification information. On the other hand, the AP function section can also establish a unique wireless network based on the network identification information indispensable for grouping communication targets in a wireless network, enabling the radio station to function as an access point.

Since the client function section and the AP function section can be simultaneously operated by the operation control section, the access point function provided by the AP function section (function for at least establishing communications with another network device) is not stopped even after necessary settings for establishing connection with a wireless network are indirectly made by the client function section through the wireless network established by the AP function section. Thus, for example, the radio application can be utilized for applications wherein another radio station communicates with a wireless network with which connection is established by the radio station through the radio station, the user is immediately notified whether or not settings for connecting the radio station to another network result in success, etc.

The invention also provides a radio station which transmits an instruction signal through a second wireless network to another radio station connected to a first wireless network through an access point, the another radio station having: an AP storage section that stores network identification information indispensable for grouping subjects of communication in a wireless network; an AP function section that establishes connection with the second wireless network based on the network identification information stored in the AP storage section; a client storage section that stores client identification information used in connecting to the first wireless network; an operation control section that simultaneously controls connection with the first wireless network based on the client identification information stored in the client storage section; and a processing execution section that executes a predetermined processing when the another radio station receives an instruction signal for instructing the another radio station to execute the predetermined processing through the second wireless network.

Therefore, the instruction signal transmitted by the second instruction transmission section can cause the another radio station to execute processing for providing the function.

The invention also provides a radio station comprising a processing execution section that executes a predetermined processing when the radio station receives an instruction signal through a second wireless network from another radio station connected to a first wireless network through an access point, the another radio station having: an AP storage section that stores network identification information indispensable for grouping subjects of communication in a wireless network; an AP function section that establishes connection with the second wireless network based on the network identification information stored in the AP storage section; a client storage section that stores client identification information used in connecting to the first wireless network; an operation control section that simultaneously controls connection with the first wireless network based on the client identification information stored in the client storage section; and an instruction transmission section that transmits the instruction signal for instructing the another radio station connected to the second wireless network to execute the predetermined processing through the second wireless network.

Therefore, after connection to the wireless network established by the another radio station with the AP function section, the instruction signal is received from the radio station, whereby processing for providing the function specified in the instruction signal can be executed.

The invention also provides a program for making a computer, which has: a client storage section that stores client identification information used in connecting to a first wireless network; a client function section that establishes connection with the first wireless network based on the client identification information stored in the client storage section; an AP storage section that stores network identification information indispensable for grouping subjects of communication in a wireless network; and an AP function section that establishes connection with a second wireless network based on the network identification information stored in the AP storage section, execute a procedure for simultaneously controlling operation of the client function section and operation of the AP function section.

The computer controlled by the program can function as a part of the radio station.

The operation control program is made up of numbered rows of instructions appropriate for processing of the computer and is a program for causing the computer to execute functions of all section of the radio station. The program is provided for the radio station, the computer, or the user using them via a record medium such as an FD, a CD-ROM, or a memory card or a communication network of the Internet, etc., for example. As the computer for executing the program, a computer incorporated in the radio station, a computer connected to the radio station by a wired or radio communication line so that data communications can be conducted, or the like can be used, for example.

The invention also provides an operation control method of controlling a radio station connected to a first wireless network through an access point, the radio station comprising an AP storage section that stores network identification information indispensable for grouping subjects of communication in a wireless network; an AP function section that establishes connection with a second wireless network based on the network identification information stored in the AP storage section; a client storage section that stores client identification information used in connecting to the first wireless network transmitted from the second wireless network; and a client function section that establishes connection with the first wireless network based on the client identification information stored in the client storage section, the operation control method including the step of: simultaneously controlling operation of the AP function section and operation of the client function section.

The radio station controlled by such the operation control method can provide similar advantages to those of the radio station.

The invention also provides an operation control method of controlling a radio station, involving the step of: transmitting an instruction signal through a second wireless network to another radio station connected to a first wireless network through an access point, the another radio station having: an AP storage section that stores network identification information indispensable for grouping subjects of communication in a wireless network; an AP function section that establishes connection with the second wireless network based on the network identification information stored in the AP storage section; a client storage section that stores client identification information used in connecting to the first wireless network; an operation control section that simultaneously controls connection with the first wireless network based on the client identification information stored in the client storage section; and a processing execution section that executes a predetermined processing when the another radio station receives an instruction signal for instructing the another radio station to execute the predetermined processing through the second wireless network.

The radio station controlled by the operation control method can provide similar advantages to those of the radio station.

The invention also provides an operation control method of controlling a radio station, involving the step of: executing a predetermined processing when the radio station receives an instruction signal through a second wireless network from another radio station connected to a first wireless network through an access point, the another radio station having: an AP storage section that stores network identification information indispensable for grouping subjects of communication in a wireless network; an AP function section that establishes connection with the second wireless network based on the network identification information stored in the AP storage section; a client storage section that stores client identification information used in connecting to the first wireless network; an operation control section that simultaneously controls connection with the first wireless network based on the client identification information stored in the client storage section; and an instruction transmission section that transmits the instruction signal for instructing the another radio station connected to the second wireless network to execute the predetermined processing through the second wireless network.

The radio station controlled by the operation control method can provide similar advantages to those of the radio station.

BRIEF DESCRIPTION OF THE DRAWINGS

FIG. 10 is a drawing to show a setting image in the first embodiment of the invention;

FIG. 17 is a flowchart to show a processing procedure of client function processing performed by the printer in the third embodiment of the invention.

DETAILED DESCRIPTION OF THE PREFERRED EMBODIMENTS

As the best mode for carrying out the invention, a network configuration wherein a plurality of network devices (simply, devices) conduct radio communications in compliance with wireless LAN standard (IEEE 802.11) will be discussed by way of example.

First Embodiment

Figure 1:
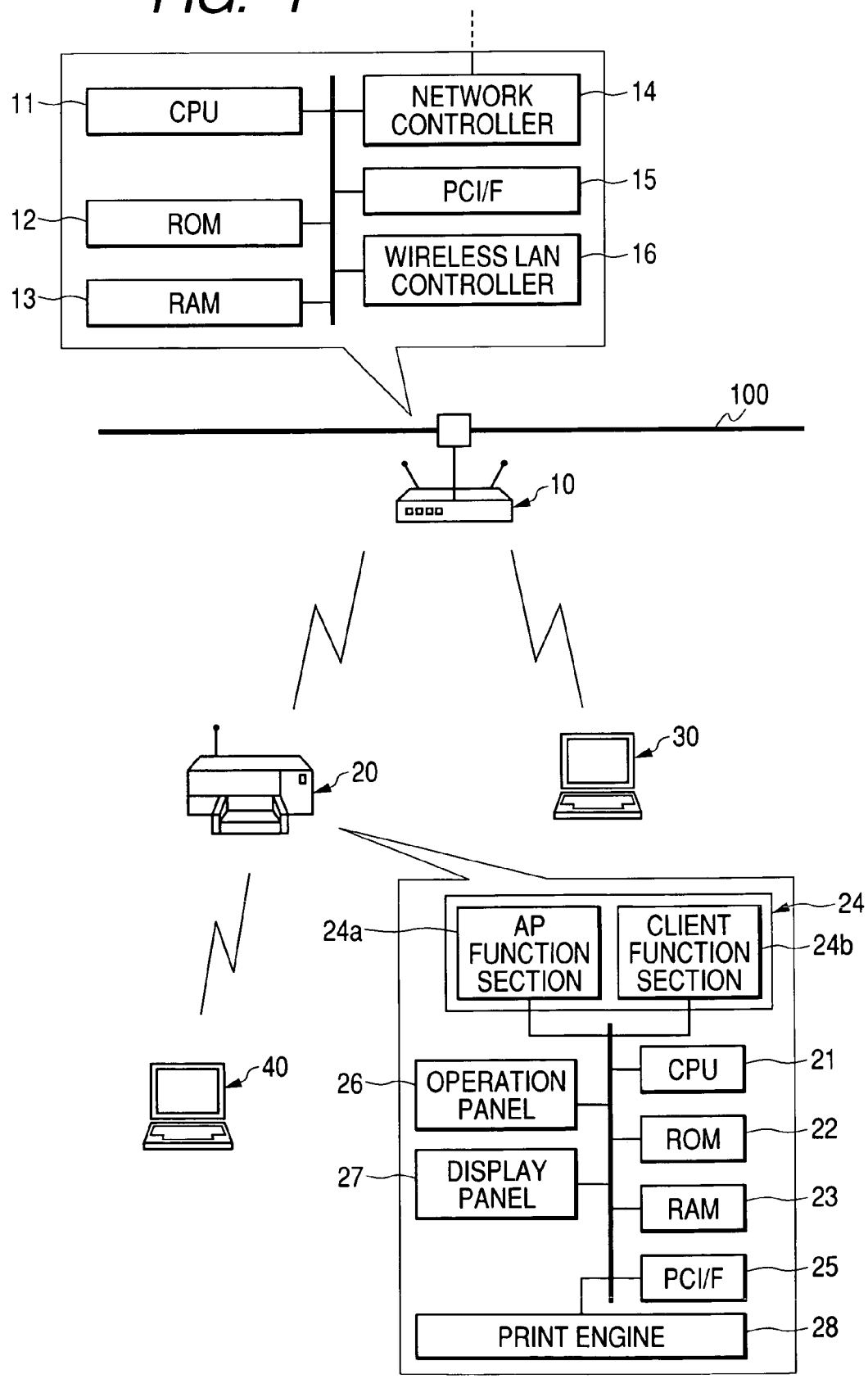
FIG. 1 is a drawing to show the network configuration common to a first embodiment and a second embodiment of the invention.

In the network configuration, devices such as an access point 10, a network printer (simply, printer) 20, and a known personal computer (PC) 30 conduct radio communications, as shown in FIG. 1.

First, the access point 10 is a device for relaying data communications between a radio station and another device (or an external network) connected via a cable 100; it includes a CPU 11, ROM 12, RAM 13, a network controller 14, a PC interface section (PC I/F) 15, a wireless LAN controller 16, etc.

The CPU 11 of the access point 10 controls the whole operation of the access point 10 by sending an instruction to each component while recording the processing result in the RAM 13 according to a processing procedure recorded in the ROM 12.

Figure 2:
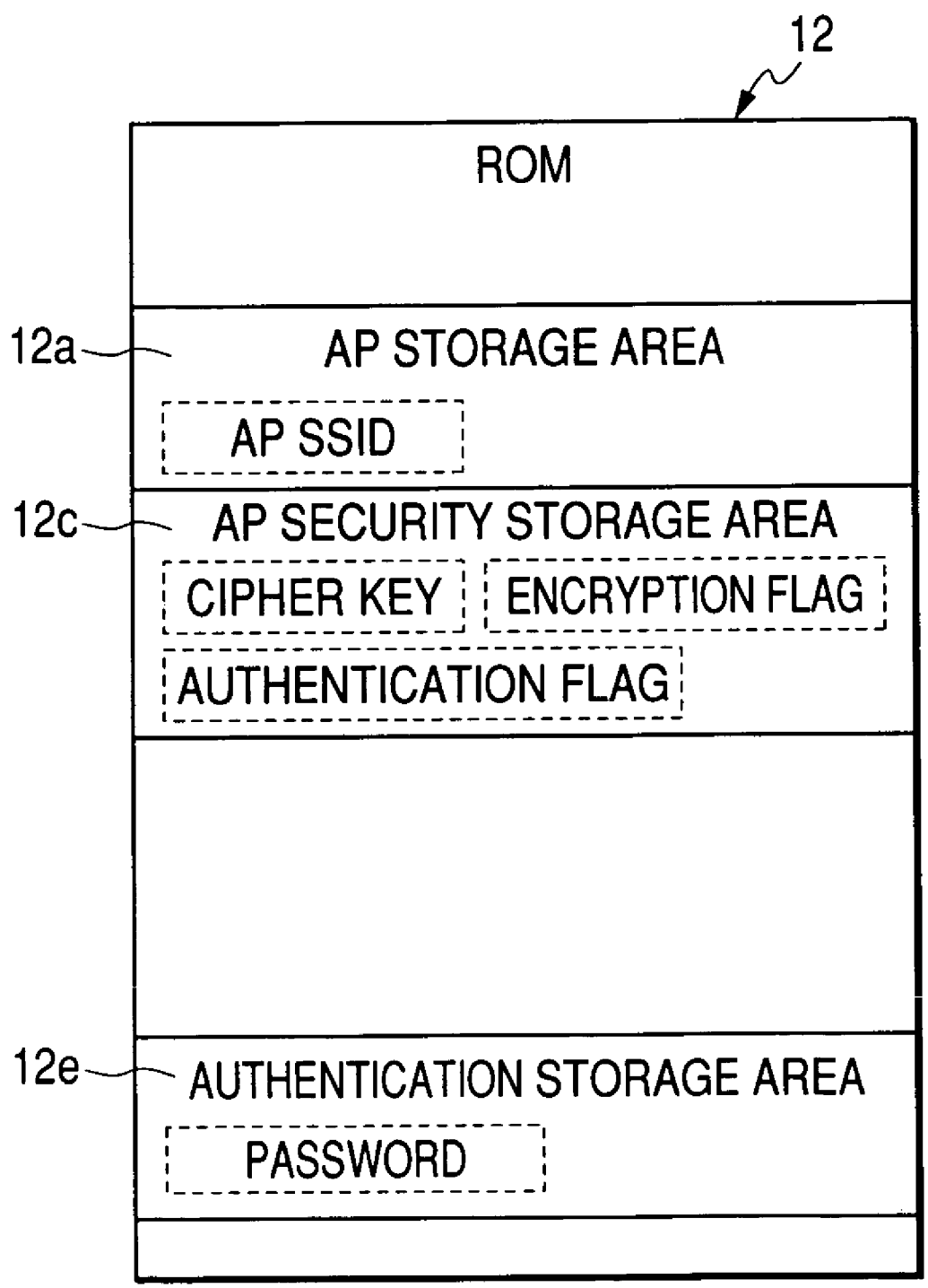
FIG. 2 is a drawing to show storage areas in ROM in an access point.

The ROM 12 is readable-writable nonvolatile memory made up of an AP storage area 12a for storing SSID (service set identifier or ESSID (extended SSID), which will be hereinafter referred to as "AP SSID") used for the access point 10 to communicate with the radio station, an AP security storage area 12c for storing parameters concerning security at the communication time, an authentication storage area 12e for storing a password used for authentication, and the like, as shown in FIG. 2. The SSID is an indispensable ID used to group communication targets in wireless network.

The network controller 14 is an interface for realizing data communications with another device (or an external network) connected via the cable 100.

The PC interface section 15 is an interface for connecting the access point 10 to a PC via communication cable. Data communications between the access point 10 and the PC are made possible through the PC interface section 15.

The wireless LAN controller 16 is an interface for realizing communications in compliance with the wireless LAN standard based on the parameters stored in the ROM 12; communications as an access point for another radio station (wireless network) are established using the AP SSID stored in the AP storage area 12a, whereby a communication function as the access point is provided.

In the described access point 10, after the AP SSID is stored in the AP storage area 12a, only the radio station accessing the access point 10 using the same SSID as the AP SSID (client SSID described later) is permitted to conduct communications as an access point (except for an exception).

At this time, if the parameters concerning security are stored in the AP security storage area 12c, communications are conducted with security measures taken based on the parameters.

The parameters concerning security include a cipher key to conduct communications in an encryption state (in the embodiment, WEP (wired equivalent privacy) key), for example. The cipher key is recorded in the AP security storage area 12c together with an encryption flag indicating whether or not communications are to be conducted in an encryption state. If the cipher key is stored together with the encryption flag (set to "1") indicating that communications are to be conducted in an encryption state, the access point 10 (CPU 11) conducts communications with the radio station in the encryption state based on the cipher key. On the other hand, if the cipher key is stored together with the encryption flag (set to "0") indicating that communications are not to be conducted in an encryption state, the access point 10 (CPU 11) conducts communications with the radio station without encryption.

The parameters concerning security include an authentication flag indicating whether or not the radio station is to be authenticated. If the authentication flag (set to "1") indicating that the radio station is to be authenticated is stored, the access point 10 authenticates the radio station before permitting the radio station to conduct communications. To authenticate the radio station, prior to communications, the access point 10 acquires the authentication key used to authenticate the radio station therefrom and if the character string of the authentication key matches the character string of the password stored in the authentication storage area 12e, the access point 10 determines that the radio station can be authenticated. On the other hand, if the authentication flag (set to "0") indicating that the radio station is not to be authenticated is stored, the access point 10 permits the radio station to conduct communications without performing authentication of the radio station.

When the access point 10 transfers the data concerning settings to and from another device by radio or in a wired manner and is indirectly set (remotely set up) from the another device, the AP SSID, the cipher key, the encryption flag, and the authentication flag are generated and are stored in the their respective areas. The password is previously recorded in the authentication storage area 12e, but can also be changed as a new password is generated in the remote setup.

Next, the printer 20 is a device usually functioning as a radio station; it includes a CPU 21, ROM 22, RAM 23, a wireless LAN controller 24, a PC interface section (PC I/F) 25, an operation panel 26, a display panel 27, a print engine 28, etc.

The CPU 21 of the printer 20 controls the whole operation of the printer 20 by sending an instruction to each component while recording the processing result in the RAM 23 according to a processing procedure recorded in the ROM 22.

Figure 3A:
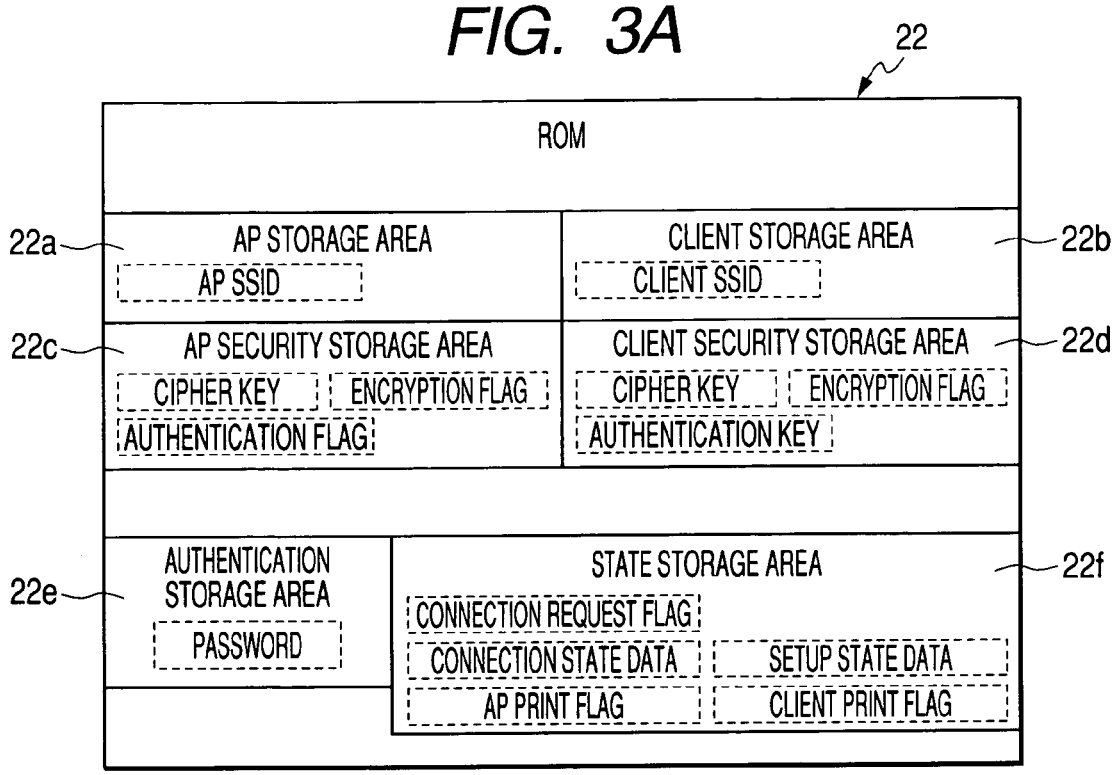
FIGS. 3A and 3B are drawings to show storage areas in ROM of each printer in the first embodiment and the second embodiment of the invention.

The ROM 22 is readable-writable nonvolatile memory made up of an AP storage area 22a for storing AP SSID used for the printer 20 to communicate with another radio station as an access point, a client storage area 22b for storing SSID used for the printer 20 to communicate with an access point as a radio station, which will be hereinafter referred to as "client SSID," an AP security storage area 22c and a client security storage area 22d for storing parameters concerning security at the communication time, an authentication storage area 22e for storing a password used for authentication, a state storage area 22f for storing the state of the printer 20, and the like, as shown in FIG. 3A.

The wireless LAN controller 24 is an interface for realizing radio communications in compliance with the wireless LAN standard based on the parameters stored in the ROM 22; it includes an AP (Access Point) function section 24a, a client function section 24b, etc. The AP function section 24a establishes communications as an access point for another radio station (wireless network) using the AP SSID stored in the AP storage area 22a, thereby providing a communication function as the access point. The client function section 24b establishes connection with an access point as a radio station using the client SSID stored in the client storage area 22ba, thereby providing a communication function as the radio station.

The PC interface section 25 is an interface for connecting the printer 20 to a PC via communication cable. Data communications between the printer 20 and the PC are made possible through the PC interface section 25.

In the described printer 20, after the client SSID is stored in the client storage area 22b, it is made possible for the printer 20 as a radio station to access and communicate with the radio station with which communications (wireless network) can be established based on the same SSID as the client SSID (AP SSID).

At this time, if the parameters concerning security are stored in the client security storage area 22d, communications are conducted with security measures taken based on the parameters.

The parameters concerning security include a cipher key to conduct communications in an encryption state, for example. The cipher key is recorded together with an encryption flag as with the access point 10. If the cipher key is stored together with the encryption flag indicating that communications are to be conducted in an encryption state, the printer 20 (CPU 21) conducts communications with the access point in the encryption state based on the cipher key. On the other hand, if the cipher key is stored together with the encryption flag indicating that communications are not to be conducted in an encryption state, the printer 20 (CPU 21) conducts communications with the access point without encryption.

The parameters concerning security also include an authentication key of the same character string as the password set in the access point to conduct communications (for example, stored in the authentication storage area 12e in the access point 10), the authentication key used for authentication by the access point. Upon reception of an authentication key request from the access point prior to communications, the printer 20 (CPU 21) returns the authentication key to the access point and if the access point authenticates the printer 20 based on the authentication key, the printer 20 is permitted to communication with the access point.

When the user operates the operation panel 26 to set the communication function as a radio station or when terminal setting data is received in terminal reception data processing later described with reference to FIG. 7, the client SSID, the cipher key, the encryption flag, and the authentication key in the communication function as a radio station are generated and are stored in the their respective areas.

After the AP SSID is stored in the AP storage area 22a, the printer 20 permits only the radio station accessing the printer 20 using the same SSID as the AP SSID (client. SSID) to conduct communications as the access point.

At this time, if the parameters concerning security are stored in the AP security storage area 22c, communications are conducted with security measures taken based on the parameters.

The parameters concerning security are similar to those in the access point 10 described above (cipher key, encryption flag, authentication flag, and password). Using the parameters, communications with the radio station are conducted in an encryption state or communications are conducted after authentication of the radio station as with the access point 10.

When the user operates the operation panel 26 to set the communication function as an access point or when relay setting data is received in relay reception data processing later described with reference to FIG. 8, the AP SSID in setting the communication function as an access point is generated and is stored in the AP storage area 22a.

The cipher key, the encryption flag, the authentication flag, and the password in setting the communication function as an access point are stored in and deleted from the AP security storage area 22c in AP function processing later described with reference to FIG. 4.

In the printer 20 (CPU 21), the operation of the AP function section 24a and that of the client function section 24b described above are simultaneously controlled, whereby the communication functions provided by the function sections are provided at the same time.

Next, the PC 30 is a computer system having the radio station function. Installed in the PC 30 are application software for making settings required for the printer 20 to establish connection with a radio station as an access point through network, application software capable of transmitting print data to print a predetermined image on the printer 20 (and a device driver), and the like.

<AP Function Processing of Printer 20>

A processing procedure of the AP function processing executed by the CPU 21 of the printer 20 will be discussed with FIG. 4. The AP function processing is processing for controlling communications of the AP function section 24a of the wireless LAN controller 24, and is repeatedly executed after the printer 20 is started.

First, whether or not the printer 20 establishes connection with an access point (for example, the access point 10) by the client function section 24b of the wireless LAN controller 24 is checked (s110). At the step, if communications with an access point are conducted (s380 to s420) in client function processing later described with reference to FIG. 6, it is determined that connection with an access point is established.

Figure 3B:
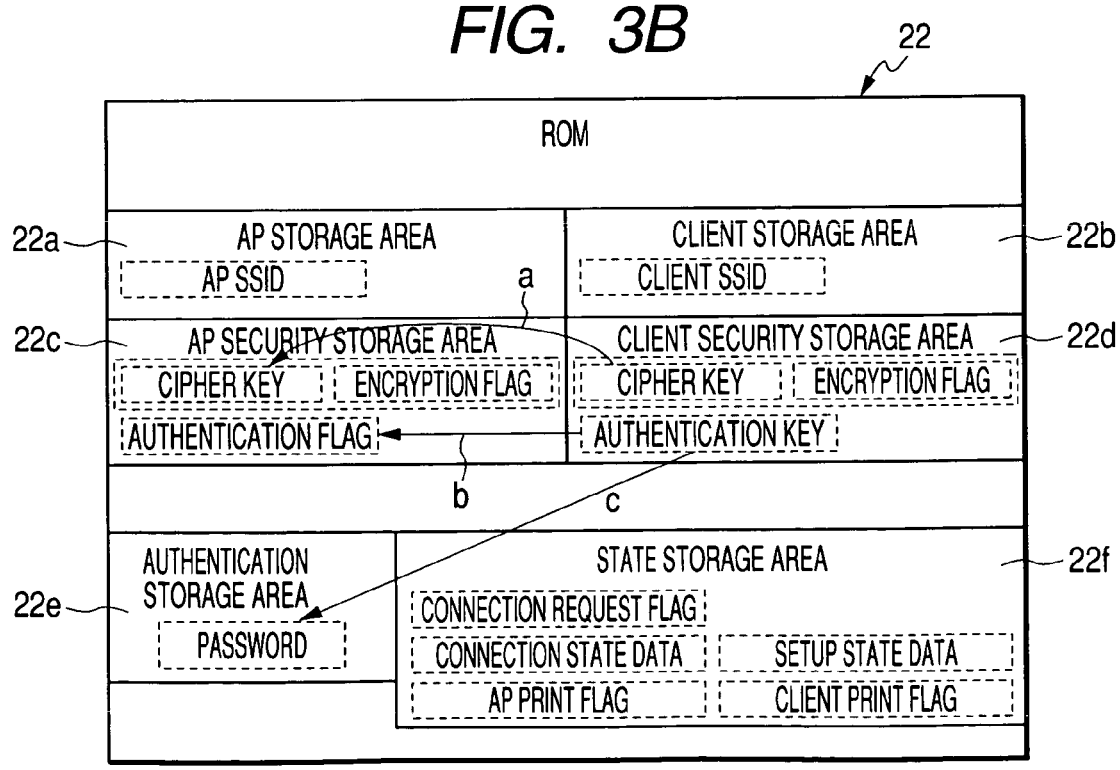

If connection with an access point is established (YES at s110), settings are made so that communications of the AP function section 24a are conducted with security measures taken as communications of the client function section 24b (s120). To do this, first, the cipher key and the encryption flag of the parameters stored in the client security storage area 22d are copied into the AP security storage area 22c (see arrow a in FIG. 3B). If an authentication key is stored in the client security storage area 22d, the authentication key is copied into the authentication storage area 22e as a password (see arrow c in FIG. 3B) and the authentication flag (set to "1") indicating that the radio station is to be authenticated is stored in the AP security storage area 22c (see arrow b in FIG. 3B). On the other hand, if no authentication key is stored in the client security storage area 22d, the authentication key is not copied into the authentication storage area 22e and the authentication flag is not stored in the AP security storage area 22c. Thus, settings are made so that communications of the AP function section 24a are conducted with security measures taken as communications of the client function section 24b (s120).

Accordingly, for example, if the cipher key is copied into the AP security storage area 22c together with the encryption flag indicating that communications are not to be conducted in an encryption state, later communications with another radio station such as a PC 40 in FIG. 1 will be conducted in an encryption state based on the cipher key. If the cipher key and the encryption flag are copied, later communications only with the radio station authenticated based on the password (authentication key) will be permitted (started).

The PC 40 is a known computer system having the radio station function, wherein application software for making settings required for the printer 20 to establish connection with a radio station as an access point through wireless network, application software capable of transmitting print data to print a predetermined image on the printer 20 (and a device driver), and the like are installed.

On the other hand, if connection with an access point is not established (NO at s110), the AP security storage area 22c and the authentication storage area 22e are initialized, thereby setting so that communications of the AP function section 24a are conducted with no security measures taken (s130). If the cipher key, the encryption flag, the authentication flag, and the password (authentication key) are stored in the corresponding storage areas, they are deleted as the storage areas are initialized. Thus, settings are again made so that communications of the AP function section 24a are conducted with no security measures taken.

After s120 or s130, whether or not the printer 20 receives a connection request (is accessed) from a radio station (for example, the PC 40) is checked (s140).

If the printer 20 does not receive a connection request (NO at s140), the process returns to s110. On the other hand, if the printer 20 receives a connection request (YES at s140), whether or not connection with the radio station making the connection request may be established is checked (s150). At the step, if the authentication flag indicating that the radio station is not to be authenticated is stored in the AP security storage area 22c, it is determined that connection with the radio station may be established only if the SSID used in the connection request sent from the radio station to the printer 20 matches the AP SSID stored in the AP storage area 22a. If the authentication flag indicating that the radio station is to be authenticated is stored in the AP security storage area 22c, the printer 20 requests the radio station to send an authentication key prior to communications. If the authentication key returned in response to the request matches the character string of the password stored in the authentication storage area 22e and the SSID used in the connection request sent from the radio station to the printer 20 matches the AP SSID, it is determined that connection with the radio station may be established.

If connection with the radio station is not to be established (NO at s150), the process returns to s110 without establishing connection. On the other hand, if it is determined that connection may be established (YES at s150), connection with the radio station is established (s160). At the step, data to start communications is transferred to and from the radio station, whereby connection with the radio station is established.

Next, whether or not data has been received from the radio station is checked (s170).

If data has been received (YES at s170), whether or not the data is a disconnection request is checked (s180). The disconnection request is data transmitted by the radio station with which connection is established at s160 to make a request for cutting off (or canceling) the connection.

If the received data is not a disconnection request (NO at s180), processing corresponding to the received data is performed (s190). The processing is described in detail later in terminal reception data processing (FIG. 7).

After s190 or if data is not received (NO at s170), whether or not the data to be transmitted to the radio station exists is checked (s200).

If the data to be transmitted does not exist (NO at s200), the process returns to s170. On the other hand, if the data to be transmitted exists (YES at s200), the data is transmitted to the radio station (s210) and then the process returns to s170.

After s170 to s210 are thus repeated, if the data received as s170 is a disconnection request (YES at s180), the connection with the radio station is cut off (s220) and then the process returns to s110. At s220, data to start communications is transferred to and from the radio station, whereby connection with the radio station is established.

<SSID Sending Processing of Printer 20>

A processing procedure of the SSID sending processing executed by the CPU 21 of the printer 20 will be discussed with FIG. 5. The SSID sending processing is processing for controlling communications of the AP function section 24a of the wireless LAN controller 24 like the AP function processing (FIG. 4), and is started when the timing at which the SSID is to be sent is reached after the printer 20 is started.

The timing at which the SSID is to be sent is stipulated according to the specifications of an access point defined by the wireless LAN standard; for example, it is the timing to transmit a beacon signal or the timing receiving a probe request. First, the beacon signal is a signal transmitted at regular time intervals for the purpose of sending the SSID used in communicating with a radio station to the surrounding radio stations by a device functioning as an access point. The probe request is data making a request to send SSID. Upon reception of the probe request, the device functioning as an access point should return data called "probe response" capable of determining the SSID used for the device to conduct communication with the radio station.

First, whether or not the printer 20 establishes connection with an access point is checked (s260). This step is similar to s110 in FIG. 4.

If connection with an access point is not established (NO at s260), the SSID is sent (s280). At the step, if the SSID sending processing is started as the timing to transmit a beacon signal is reached, a beacon signal capable of determining the AP SSID stored in the AP storage area 22a is generated and is transmitted, whereby the AP SSID is sent to the surrounding radio stations. If the SSID sending processing is started as the timing receiving a probe request is reached, a probe response capable of determining the AP SSID stored in the AP storage area 22a is generated and is transmitted, whereby the SSID is sent to the radio station transmitting the probe request (for example, the PC 40).

Thus, after s280 or if connection with an access point is established (YES at s260), the SSID sending processing is terminated. Thus, if connection with an access point is established, the SSID is not sent.

<Client Function Processing of Printer 20>

A processing procedure of the client function processing executed by the CPU 21 of the printer 20 will be discussed with FIG. 6. The client function processing is processing for controlling communications of the client function section 24b of the wireless LAN controller 24. After the printer 20 is started, when a request to connect to an access point (for example, the access point 10) occurs or when a connection request flag stored in the state storage area 22f is set to "1" in terminal reception data processing later described with reference to FIG. 7 or relay reception data processing later described with reference to FIG. 8, the client function processing is started.

First, a connection request is transmitted (s310). At the step, a connection request as a radio station is transmitted to an access point. To make the connection request, the client SSID stored in the client storage area 22b is used. Data to start communications is transmitted from the access point receiving the connection request after a similar determination to that at s150 is FIG. 4 is made and connection is established.

Next, whether or not connection with the access point is established is checked (s320). At the step, if data to start communications is received from the access point within a predetermined time (in the embodiment, 250 ms) after the connection request was transmitted at s310, it is determined that connection with the access point is established. On the other hand, if data is not received within the predetermined time, it is determined that connection with the access point cannot be established.

If connection with the access point cannot be established (NO at s320), the connection request flag is set to "0" (s330) and connection state data indicating that connection with the access point cannot be established (radio connection error) is stored in the state storage area 22f (s340) and then the client function processing is terminated. The connection state data is data used in terminal reception data processing later described with reference to FIG. 7 and relay reception data processing later described with reference to FIG. 8. If the connection state data is already stored in the previously executed client function processing, the data is changed to the connection state data indicating that connection with the access point cannot be established.

On the other hand, if connection with the access point can be established (YES at s320), checking is executed to see if settings are made so that normal data communications can be executed with the network to which the access point is connected so as to be able to conduct data communications (for example, external network where the access point 10 can conduct data communications via the cable 100) (s350). Here, if setup items required for connecting to the network to which the access point is connected so as to be able to conduct data communications are set for the printer 20 in a predetermined storage area and data communications can be conducted according to the setup items, it is determined that settings are made so that normal data communications can be executed. The setup items are IP address, subnet mask, default gateway, etc., for example. In this case, if an ICMP echo reply is returned after an ICMP echo request (ping instruction) is transmitted to the IP address set as the default gateway, it can be determined that settings are made so that normal data communications can be executed.

If settings are not made so that normal data communications can be executed (NO at s350), connection state data indicating that normal data communications cannot be executed (network connection error) is stored in the state storage area 22f (s360) and then the client function processing is terminated. Also at s360, if the connection state data is already stored, the data is changed to the connection state data indicating that normal data communications cannot be executed.

On the other hand, if settings are made so that normal data communications can be executed (YES at s350), connection state data indicating that normal data communications can be executed (network connection enable) is stored in the state storage area 22f (s370). Also at s370, if the connection state data is already stored, the data is changed to the connection state data indicating that normal data communications can be executed.

Next, whether or not data has been received from the access point is checked (s380).

Figure 8:
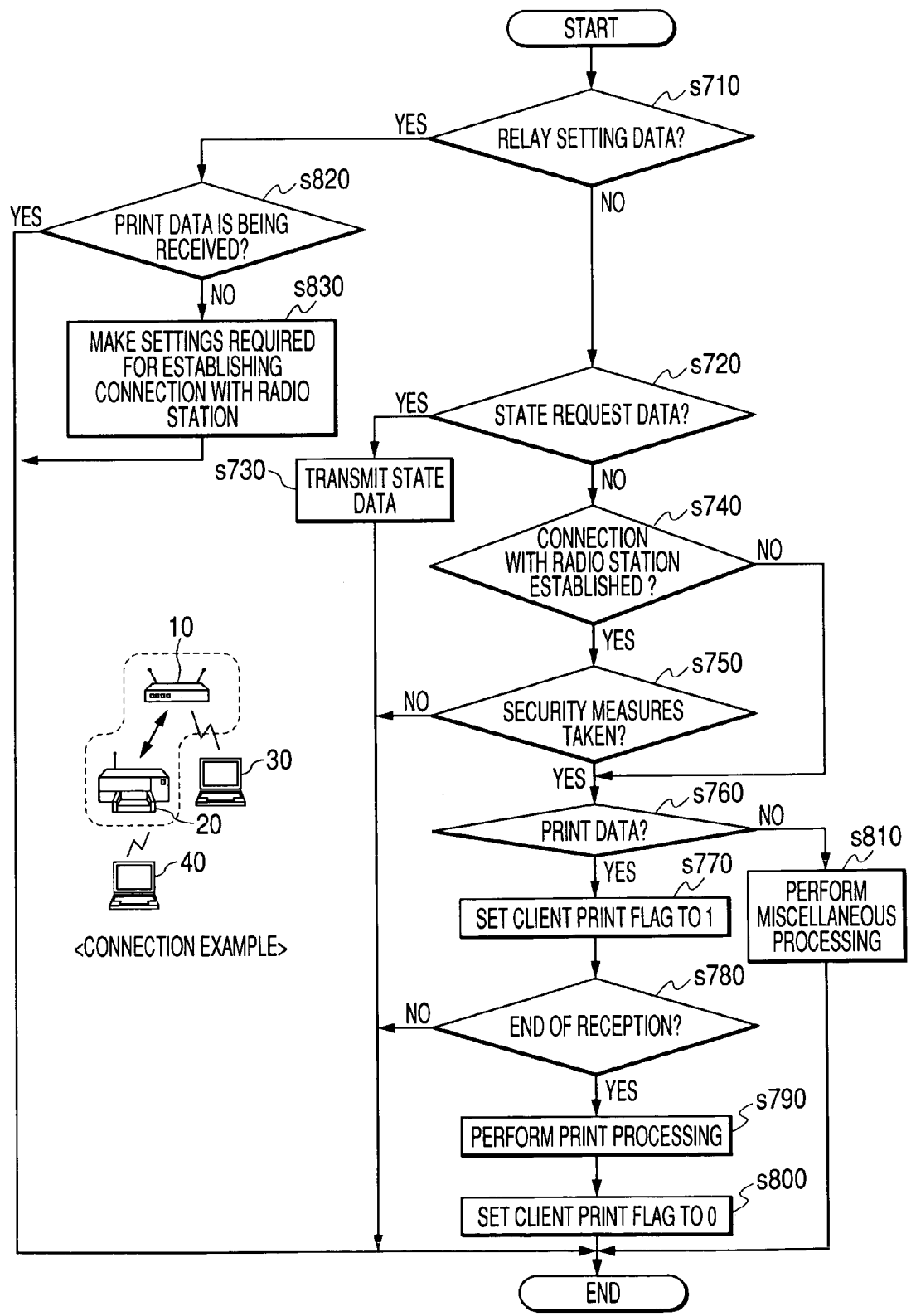
FIG. 8 is a flowchart to show a processing procedure of relay reception data processing.

If data has been received (YES at s380), processing corresponding to the received data is performed (s390) The processing is described in detail later in relay reception data processing (FIG. 8).

After s390 or if data is not received (NO at s380), whether or not the data to be transmitted to the access point exists is checked (s400).

If the data to be transmitted exists (YES at s400), the data is transmitted to the access point (s410).

After s410 or if the data to be transmitted does not exist (NO at s400), whether or not connection with the access point is to be cut off is checked (s420). At the step, if data communications with the access point terminate, it is determined that connection with the access point is to be cut off.

If connection with the access point is not to be cut off (NO at s420), the process returns to s380.

On the other hand, if connection with the access point is to be cut off (YES at s420), connection with the access point is cut off (s430) and then the client function processing is terminated. At s430, data to terminate communications is transferred to and from the access point after a disconnection request is transmitted to the access point, whereby connection with the access point is cut off.

<Terminal Reception Data Processing of Printer 20>

A processing procedure of the terminal reception data processing executed by the CPU 21 of the printer 20 will be discussed with FIG. 7. The terminal reception data processing is detailed processing at s190 in FIG. 4.

Figure 4:
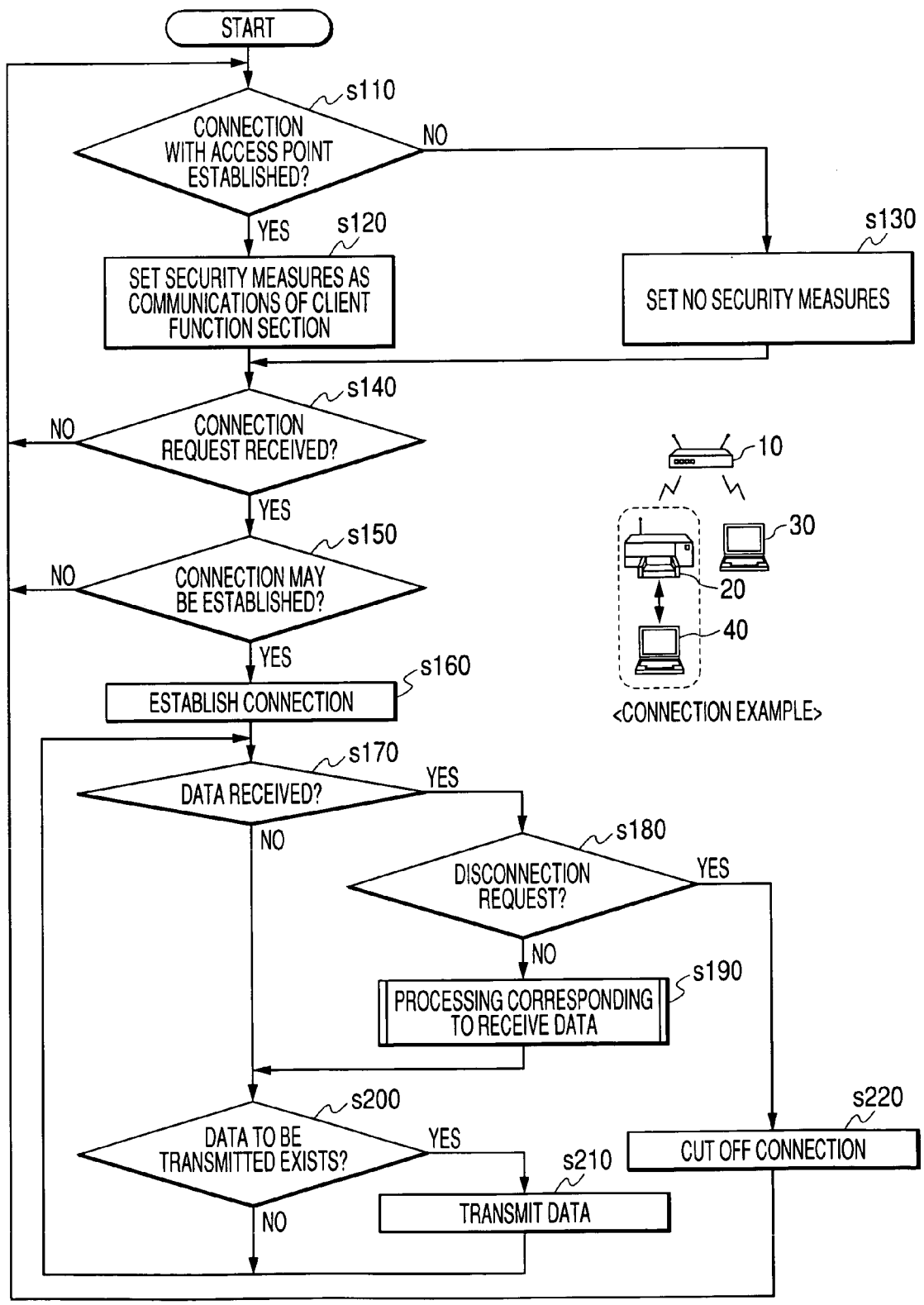
FIG. 4 is a flowchart to show a processing procedure of AP function processing.

First, whether or not the received data at s170 in FIG. 4 is terminal setup data is checked (s510). The terminal setup data is data capable of determining various setup items for the printer 20 to establish connection with an access point (for example, the access point 10), the data for giving a setting instruction based on the setup items. The terminal setup data is data transmitted from a radio station establishing connection with the printer 20 as an access point; for example, it is transmitted by the PC 40 establishing connection with the printer 20 in remote setup processing later described with reference to FIG. 9. The various setup items are specifically data capable of determining one or more parameters involving at least the client SSID, of the client SSID, the cipher key, the encryption flag, and the authentication key.

If the data is not terminal setup data (NO at s510), whether or not the data is connection instruction data is checked (s520). The connection instruction data is instruction data for checking whether or not the printer 20 can establish connection with an access point. The connection instruction data is data transmitted from a radio station establishing connection with the printer 20 as an access point; for example, it is transmitted by the PC 40 establishing connection with the printer 20 after transmitting terminal setup data in remote setup processing later described with reference to FIG. 9.

If the data is connection instruction data (YES at s520), the setup state concerning the communication function as a radio station is checked (s530). At the step, conditions as to whether or not the client SSID is stored in the client storage area 22b, whether or not the cipher key is stored in the client security storage area 22d together with the encryption flag indicating that communications are to be conducted in an encryption state, and whether or not the authentication key is stored in the client security storage area 22d are checked. If all conditions are satisfied, it is determined that the setup state is sufficient for realizing the communication function as a radio station. On the other hand, if any one of the conditions is not satisfied, it is determined that the setup state is insufficient.

If it is determined that the setup state is sufficient (YES at s530), setup state data indicating that the setup state is sufficient is stored in the state storage area 22f (s540). The setup state data is data used in processing described later. If the setup state data is already stored in the previously executed terminal reception data processing, the data is changed to the setup state data indicating that the setup state is sufficient.

Next, the connection request flag stored in the state storage area 22f is set to "1" (s550). At the step, the connection request flag is set to "1," whereby the client function processing previously described with reference to FIG. 6 is started and accordingly whether or not the printer 20 can establish connection with the access point is checked. If connection can be established, the connection state data indicating that connection can be established (network connection enable) is stored in the state storage area 22f. On the other hand, if connection cannot be established, the connection state data indicating that connection cannot be established (radio connection error) is stored in the state storage area 22f.

If it is determined that the setup state is insufficient (NO at s530), setup state data indicating that the setup state is insufficient is stored in the state storage area 22f (s560). Also at s560, if the setup state data is already stored, the data is changed to the setup state data indicating that the setup state is insufficient.

After s550 or s560, the terminal reception data processing is terminated. Thus, only if the setup state is sufficient for realizing the communication function as a radio station, the connection request flag is set to "1" and whether or not the printer 20 can establish connection with the access point is checked.

If the data is not connection instruction data (NO at s520), whether or not the data is state request data is checked (s570). The state request data is data for making a request to transmit the connection state data and the setup state data stored in the state storage area 22f, and is transmitted from the radio station establishing connection with the printer 20 as an access point. Specifically, it is transmitted by the PC 40 establishing connection with the printer 20 after transmitting terminal setup data and connection instruction data in remote setup processing later described with reference to FIG. 9.

If the data is state request data (YES at s570), the connection state data and the setup state data stored in the state storage area 22f are transmitted to the party transmitting the data received at s170 in FIG. 4 (s580).

If the data is not state request data (NO at s570), whether or not the printer 20 establishes connection with an access point (for example, the access point 10) is checked (s590). This step is similar to s110 in FIG. 4.

If connection with an access point is established (YES at s590), whether or not communications with the access point are conducted with security measures taken is checked (s600). At the step, if the authentication key and the encryption flag indicating that communications are to be conducted in an encryption state are stored in the client security storage area 22d, it is determined that communications are conducted with security measures taken.

If communications are not conducted with security measures taken (NO at s600), the terminal reception data processing is terminated.

If communications are conducted with security measures taken (YES at s600) or if connection with an access point is not established (NO at s590), whether or not the received data at s170 in FIG. 4 is print data is checked (s610). The print data is data transmitted consecutively from the radio station (for example, the PC 40) for causing the print engine 28 to print a predetermined image.

If the data is print data (YES at s610), an AP print flag stored in the state storage area 22f is set to "1" (s620). The AP print flag is set to "0" in the initial state and is set to "1" only when print data is received from a radio station; the flag is used in relay reception data processing later described with reference to FIG. 8.

Next, whether all print data has been received is checked (s630).

If all print data has been received (YES at s630), the print engine 28 is caused to print the image indicated by all print data (s640) and the AP print flag stored in the state storage area 22f is set to "0" (s650) and then the terminal reception data processing is terminated. On the other hand, if receiving the print data is not complete (NO at s630), the terminal reception data processing is terminated without setting the AP print flag.

If the data is not print data (NO at s610), processing responsive to the data (miscellaneous processing) is performed (s660). This processing is processing for realizing any other function than the function of the printer 20 described above, but the specific processing description is not important in understanding the invention and therefore will not be discussed.

If the data is not terminal setup data (NO at s510), whether or not print data is being received is checked (s670). At the step, it is determined that print data is being received only if an client print flag is set to "1." The client print flag is set to "1" only when print data is being received from the access point in relay reception data processing later described with reference to FIG. 8.

If print data is not being received (NO at s670), settings required for the printer 20 to establish connection with the access point are made based on the terminal setup data (s680) and then the process goes to s530. At s680, first the client SSID determined according to the terminal setup data is stored in the client storage area 22b as various setup items for the printer 20 to establish connection with the access point. Next, if the cipher key, the encryption flag, and the authentication key can be determined from the terminal setup data, they are stored in the client security storage area 22d.

If print data is being received (YES at s670), the terminal reception data processing is terminated without making settings required for the printer 20 to establish connection with the access point.

<Relay Reception Data Processing of Printer 20>

A processing procedure of the relay reception data processing executed by the CPU 21 of the printer 20 will be discussed with FIG. 8. The relay reception data processing is detailed processing at s390 in FIG. 6.

Figure 6:
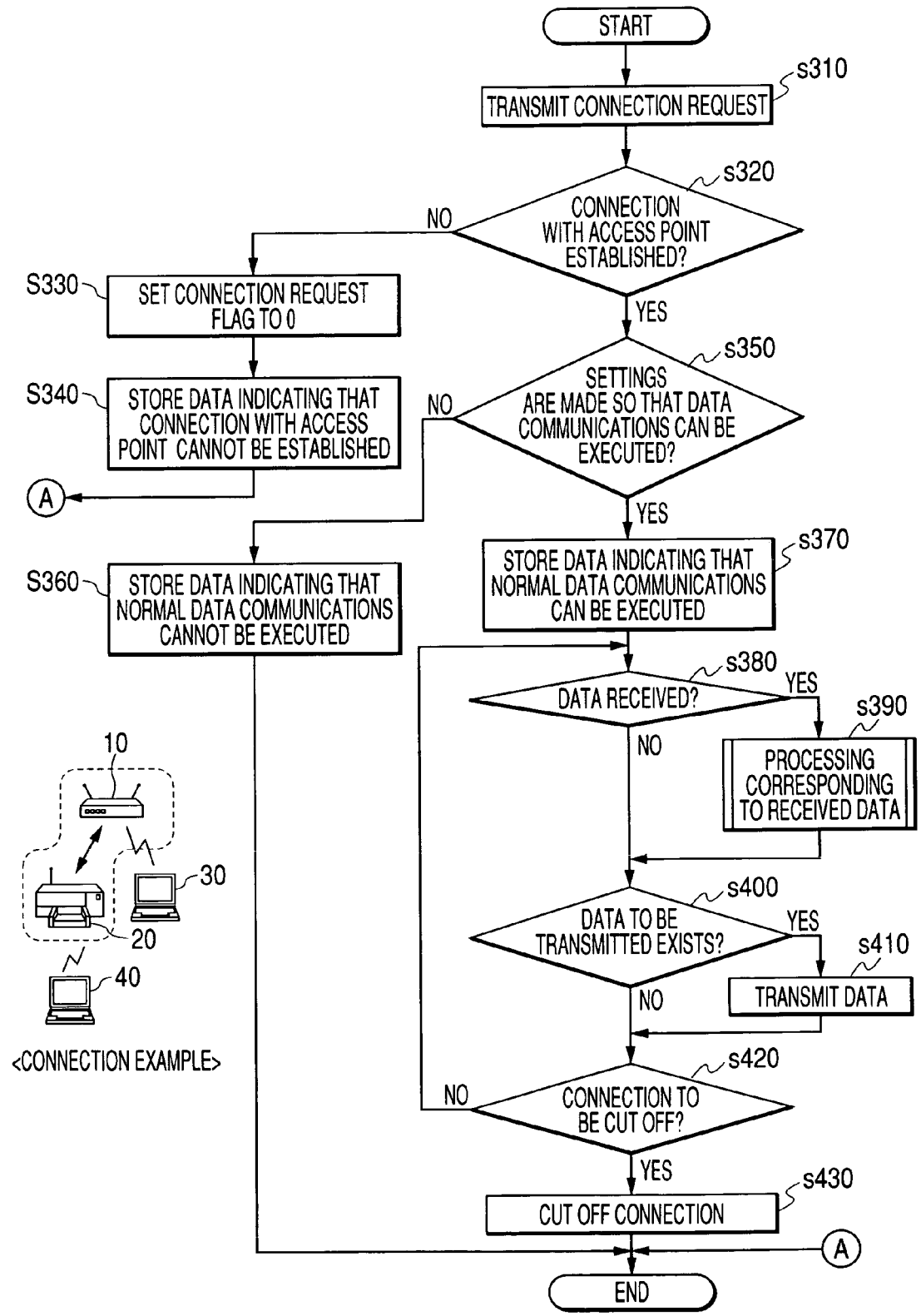
FIG. 6 is a flowchart to show a processing procedure of client function processing.

First, whether or not the received data at s380 in FIG. 6 is relay setup data is checked (s710). The relay setup data is data capable of determining various setup items for the printer 20 to establish connection with a radio station, the data for giving a setting instruction based on the setup items. The relay setup data is data transmitted from an access point establishing connection with the printer 20 as a radio station; for example, it is transmitted by the PC 30 establishing connection with the printer 20 through the access point 10 in remote setup processing later described with reference to FIG. 9. The various setup items are specifically data capable of determining one or more parameters involving at least the AP SSID, of the AP SSID, the cipher key, the encryption flag, and the authentication flag.

If the data is not relay setup data (NO at s710), whether or not the data is state request data is checked (s720). The state request data is data transmitted from the radio station establishing connection with the printer 20. For example, it is transmitted by the PC 30 establishing connection with the printer 20 through the access point 10 after transmitting terminal setup data in remote setup processing later described with reference to FIG. 9.

If the data is state request data (YES at s720), the connection state data and the setup state data stored in the state storage area 22f are transmitted to the party transmitting the data received at s380 in FIG. 6 (s730) and then the relay reception data processing is terminated.

If the data is not state request data (NO at s720), whether or not the printer 20 establishes connection with a radio station is checked (s740). At the step, if communications with a radio station (for example, the PC 40) are conducted by the AP function section 24a, it is determined that connection with an access point is established.

If connection with a radio station is established (YES at s740), whether or not communications with the radio station are conducted with security measures taken is checked (s750). At the step, if the authentication key and the encryption flag indicating that communications are to be conducted in an encryption state are stored in the AP security storage area 22c and the password is stored in the authentication storage area 22e, it is determined that communications are conducted with security measures taken.

If communications are not conducted with security measures taken (NO at s750), the relay reception data processing is terminated.

On the other hand, if communications are conducted with security measures taken (YES at s750) or if connection with a radio station is not established (NO at s740), whether or not the received data at s170 in FIG. 4 is print data is checked (s760). The print data is data transmitted consecutively from the radio station (for example, the access point 10) for causing the print engine 28 to print a predetermined image.

If the data is print data (YES at s760), the client print flag stored in the state storage area 22f is set to "1" (s770). This step is similar to s620 in FIG. 7. The client print flag is set to "1" only when print data is being received from the radio station in the terminal reception data processing in FIG. 7.

Next, whether all print data has been received is checked (s780).

If all print data has been received (YES at s780), the print engine 28 is caused to print the image indicated by all print data (s790) and the client print flag stored in the state storage area 22f is set to "0" (s800) and then the relay reception data processing is terminated. On the other hand, if receiving the print data is not complete (NO at s780), the relay reception data processing is terminated without setting the client print flag.

In the embodiment, printing is executed after all print data has been received. However, the invention can also be applied to a printer designed for printing data every unit data such as one-page data or data as much as the print width. In this case, processing of printing each time unit data is received is repeated at s780 and s790 and upon detection of receiving all print data, the process goes to s800. This also applies to the processing at s630 to s650.

If the data is not print data (NO at s760), processing responsive to the data (miscellaneous processing) is performed (s810). This processing is processing for realizing any other function than the function of the printer 20 described above, but the specific processing description is not important in understanding the invention and therefore will not be discussed.

If the data is not relay setup data (NO at s710), whether or not print data is being received is checked (s820). At the step, it is determined that print data is being received only if the AP print flag is set to "1."

If print data is not being received (NO at s820), settings required for the printer 20 to establish connection with the radio station are made based on the relay setup data (s830) and then the relay reception data processing is terminated. At s830, first the AP SSID determined according to the relay setup data is stored in the AP storage area 22a as various setup items for the printer 20 to establish connection with the radio station. Next, if the cipher key, the encryption flag, and the authentication flag can be determined from the relay setup data, they are stored in the AP security storage area 22c.

If print data is being received (YES at s820), the relay reception data processing is terminated without making settings required for the printer 20 to establish connection with the radio station.

<Remote Setup Processing of PC 30, 40>

A processing procedure of the remote setup processing executed by the PC 30, 40 will be discussed with FIG. 9. The remote setup processing is started when the PC 30 establishes connection with the printer 20 through the access point 10 and the user sets one or more parameters involving at least the AP SSID, of the AP SSID, the cipher key, the encryption flag, and the authentication flag for the printer 20 using the application function for making settings required for the printer 20 as an access point to establish connection with a radio station; the remote setup processing is started when the PC 40 establishes connection with the printer 20 as an access point and the user sets one or more parameters involving at least the client SSID, of the client SSID, the cipher key, the encryption flag, and the authentication key for the printer 20 using the application function for making settings required for the printer 20 to establish connection with the access point 10.

In the embodiment, for the user to set one or more parameters, a setting image as shown in FIG. 10 is displayed on a display and the user enters, selects, etc., various setup items and then clicks on an OK button b1.

First, setup data is transmitted (s910). At the step, relay setup data is generated in the PC 30 (terminal setup data is generated in the PC 40) as the data capable of determining the setup items to be set by the user for the printer 20, and the generated data is transmitted to the printer 20. The terminal setup data is data received at the printer 20 at s510 in FIG. 7 and the relay setup data is data received at the printer 20 at s710 in FIG. 8.

After s910, only the PC 40 transmits connection instruction data to the printer 20 (s920). The connection instruction data is data received at the printer 20 at s520 in FIG. 7. At s920, the connection instruction data is transmitted after a sufficient time for making settings concerning the terminal setup data in the printer 20 has elapsed since the terminal setup data was transmitted at s910.

Figure 7:
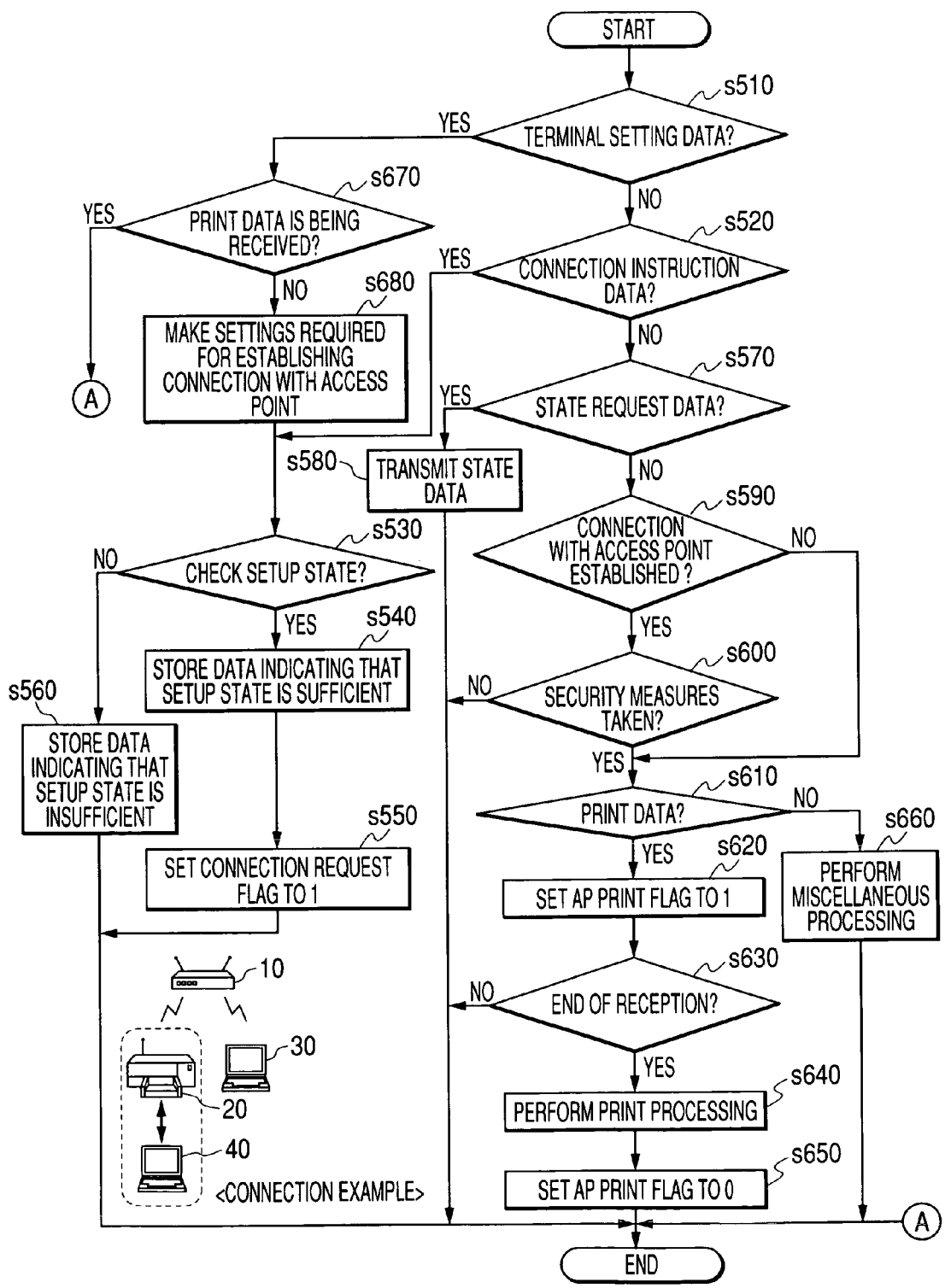
FIG. 7 is a flowchart to show a processing procedure of terminal reception data processing.

After the PC 30 executes s910 (after the PC 40 executes s920), the PC 30, 40 transmits state request data to the printer (s930) The state request data is data received at the printer 20 at s570 in FIG. 7 and data received at the printer 20 at s720 in FIG. 8. At s930, the PC 30 transmits the state request data after a sufficient time for making settings concerning the relay setup data in the printer 20 has elapsed since the relay setup data was transmitted at s910. At s930, the PC 40 transmits the state request data after a sufficient time for checking establishment based on the connection instruction data in the printer 20 has elapsed since the connection instruction data was transmitted at s920. The printer 20 receiving the state request data transmits connection state data at s580 in FIG. 7 and setup state data at s730 in FIG. 8.

The PC 30, 40 waits until reception of the connection state data, the setup state data from the printer 20 (NO at s940). Upon reception of the data (YES at s940), the PC 30, 40 notifies the user of the connection state indicated by the connection state data, the setup state indicated by the setup state data (s950). To do this, the connection state, the setup state is displayed on the display.

[Advantages of the First Embodiment]

According to the printer 20 in the first embodiment described above, the client function section 24b of the wireless LAN controller 24 provides the essential function of the radio station for establishing connection with the wireless network provided by the external predetermined access point (access point 10) and corresponding to the client SSID. On the other hand, the AP function section 24a can also establish a unique wireless network based on the AP SSID indispensable for grouping communication targets in the wireless network for causing the printer 20 to function as an access point.

Since the client function section 24b and the AP function section 24a are controlled at the same time by the CPU 21, the AP function section 24a, namely, the function as the access point is not stopped even after the client function section 24b indirectly makes settings required for establishing connection with the wireless network through the wireless network established by the AP function section 24a. Thus, for example, the printer 20 can be utilized for application wherein another radio station (for example, the PC 40) conducts radio communications with the wireless network via the printer 20.

Figure 5:
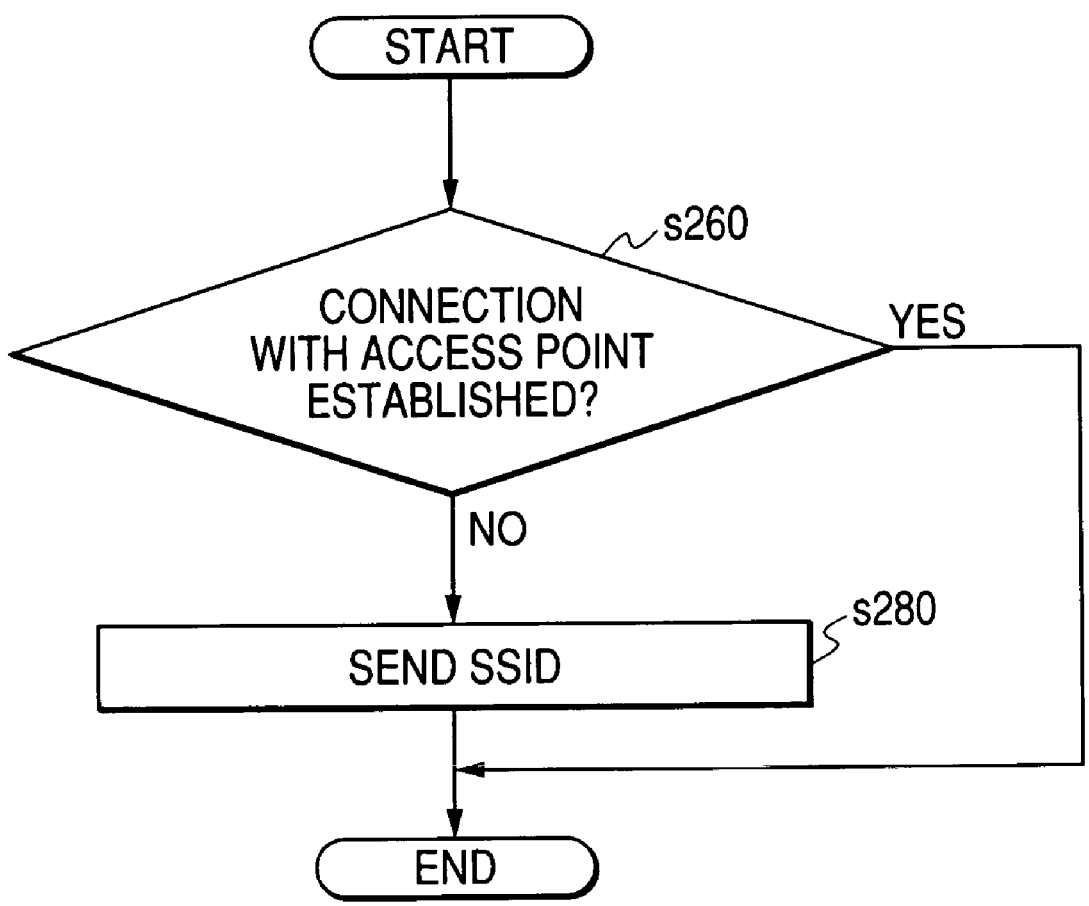
FIG. 5 is a flowchart to show a processing procedure of SSID sending processing.

The printer 20 does not perform sending the SSID (one of the access point functions), namely, stops a part of the access point functions while connection with an access point (for example, the access point 10) is established by the radio station function at s260 in FIG. 5. Thus, while the printer 20 communicates with an access point by the radio station function, the SSID required for establishing the wireless network by the AP function section 24a is not transmitted. Thus, the radio wave involved in transmitting the SSID can be prevented from having some adverse effect (for example, interference, a decrease in the communication speed, etc.,) on communications with the access point.

The printer 20 can also print an image based on the print data received through the network (s610 in FIG. 7, s760 in FIG. 8) and therefore can provide image print service not only for the PC with which connection is established through the access point 10, but also for the PC 40 with which direct connection is established. Thus, although the PC 40 is not an authorized radio station set so as to be able to establish connection with the wireless network established by the access point 10, the PC 40 connects to the wireless network established by the printer 20 as an access point and transmits print data to the printer 20, whereby the PC can directly use the service that can be provided by the printer 20 (image print service) not via the wireless network established by the access point 10.

There is also a possibility that a radio station which is not an authorized station may be operated by a malicious user trying to make unauthorized access to the wireless network, etc. Such circumstances where a radio station can easily connect to the wireless network are detrimental to security. Thus, as the service that can be provided by the printer 20 can be used not via the wireless network with which connection is established by the printer 20 with the radio station function as described above, for example, even if service is provided for a radio station other than authorized radio stations, operated by a guest user, security of the wireless network is not degraded.

Upon reception of the terminal setup data at s510 in FIG. 7, if print data is not being received, settings for establishing connection with the access point are made based on the terminal setup data at s680. Since the terminal setup data is data received directly from a radio station by the printer 20 with the access point function, for example, a radio station such as the PC 40 can indirectly make settings required for establishing connection with the access point through the wireless network established as access point, namely, can execute remote setup.

Particularly, the printer 20 can also function as an access point while providing the essential function of the radio station and therefore the radio station for executing remote setup may be able to connect to the wireless network established as access point in the infrastructure mode. Thus, for example, even if the PC 30 of the radio station used in the infrastructure mode is used for remote setup, the PC 30 need not be switched into the ad hoc mode and expense in time and effort required for remote setup can be decreased.

After settings are made at s680 in FIG. 7, the connection request flag is set to "1" at s550, whereby the client function processing (FIG. 6) is started and whether or not the printer 20 can establish connection with the access point is checked and then upon reception of the state request data from the radio station, the connection state data and the setup state data are returned at s580 and s730. The connection state data and the setup state data indicate the connection state and the setup state following the check results described above and thus report the connection state and the setup state. Thus, after remote setup is executed as described above, the radio station can be notified whether or not connection to the wireless network established by the access point (for example, the access point 10) can be normally established by the remote setup (see s950 in FIG. 9).

Figure 9:
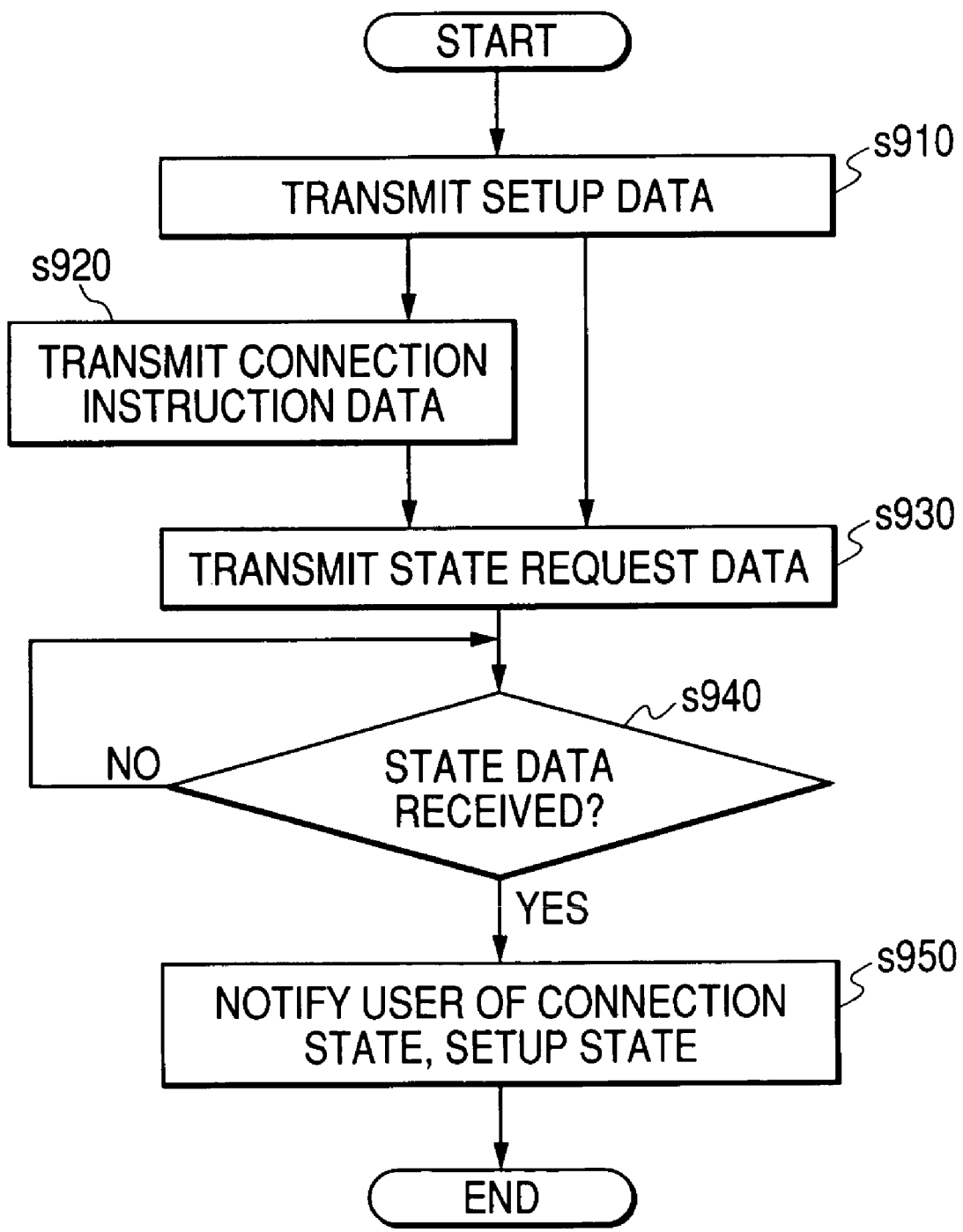
FIG. 9 is a flowchart to show a processing procedure of remote setup processing in the first embodiment of the invention.

Thus, the user of the PC 30, 40 can check whether or not connection to the wireless network established by the access point can be normally established by the remote setup according to the information (connection state, setup state) provided at s950 in FIG. 9.

At s510 in FIG. 7, when the terminal setup data is received from the wireless network (PC 40) established by the printer 20 as access point, if print data is being received from the wireless network (PC 30) established by the access point 10, settings based on the terminal setup data are skipped.

When the printer 20 establishes connection with the wireless network established by the access point, if settings based on the terminal setup data are made, communications with the wireless network already established are suddenly interrupted as the settings are changed. Thus, when the printer 20 receives the print data from the wireless network established by the access point, if interruption of communications described above occurs, reception of the print data becomes incomplete and it is feared that some adverse effect such that the printer 20 cannot print a normal image may occur. Thus, when the terminal setup data is received, if the print data is being received, settings based on the terminal setup data are skipped as described above, so that occurrence of some adverse effect caused by interruption of communications can be prevented.

Likewise, at s710 in FIG. 8, when the relay setup data is received from the wireless network (PC 30) established by the access point 10, if print data is being received from the wireless network (PC 40) established by the printer 20 as access point, settings based on the relay setup data are skipped. In this case, occurrence of some adverse effect caused by interruption of communications can also be prevented for a similar reason.

When connection with the access point 10 is established at s110 in FIG. 4, the security measures taken for communications with the access point (authentication and cipher key) can be applied to communications with the wireless network established by the printer 20 as access point. Thus, security similar to that for communications with the access point can also be provided for communications with the wireless network established by the printer 20 as access point.

Second Embodiment

A network configuration of a second embodiment of the invention is similar to that of the first embodiment; they differ only in processing procedure of remote setup processing executed by PC 30, 40 and therefore only the difference will be discussed in detail.

<Remote Setup Processing of PC 30, 40>

A processing procedure of the remote setup processing executed by a PC 30, 40 will be discussed with FIG. 11. In the embodiment, to set one or more parameters for printer 20, the user displays on a display the first setting image of i types (in the embodiment, three types) of setting images displayed on the display as popup screens. In the setting image, the user enters or selects a specific set item and then selects a NEXT button b2, whereby the i types of setting images are displayed in order in a wizard form (see FIGS. 12A to 12C).

First, a variable N is initialized (s1010). At the step, 1 is set in the variable N (1->N). In the description to follow, "n" indicates the value set in the variable N.

Next, whether or not the value n of the variable N reaches the number of setting images, i, (i=n) is checked (s1020).

If the value n of the variable N does not reach the number of setting images, i, (NO at s1020), the nth setting image is displayed (s1030). After the nth setting image is displayed, the user can enter or select a specific set item by operating an operation section of a keyboard, a mouse, etc., and then can select the NEXT button b2.

Next, the CP 30, 40 waits until the user selects the NEXT button b2 in the nth setting image (NO at s1040). When the user selects the NEXT button b2 (YES at s1040), setup data is transmitted (s1050). At the step, the data capable of determining the setup item entered or selected in the nth setting image is generated as relay setup data in the PC 30 (terminal setup data in the PC 40), and the generated data is transmitted to the printer 20. The terminal setup data is data received at the printer 20 at s510 in FIG. 7 and the relay setup data is data received at the printer 20 at s710 in FIG. 8.

After s1050, only the PC 40 transmits connection instruction data to the printer 20 (s1060). This step is similar to s920 in FIG. 9.

After the PC 30 executes s1050 (after the PC 40 executes s1060), the PC 30, 40 transmits state request data to the printer (s1070). This step is similar to s930 in FIG. 9.

Next, the PC 30, 40 waits until reception of the connection state data, the setup state data from the printer 20 (NO at s1080). Upon reception of the data (YES at s1080), the setup state indicated by the setup state data is checked (s1090). At the step, whether or not the setup state indicated by the setup state data is sufficient setup state is checked.

If the setup state indicated by the setup state data is not sufficient setup state (NO at1090), 1 is added to the variable N (n+1->N) (s1100) and then the process returns to s1020.

As s1020 to s1100 are thus repeated, the state request data for the first to i-1st setting images is transmitted in order until the setup state data indicating the sufficient setup state is transmitted.

Figure 12A:
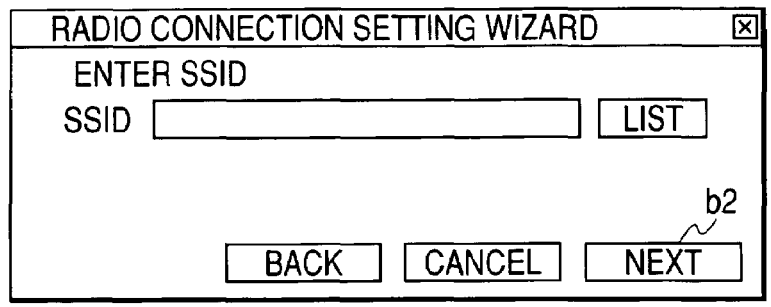
FIGS. 12A to 12E are drawings to show setting images in the second embodiment of the invention.
Figure 12B:
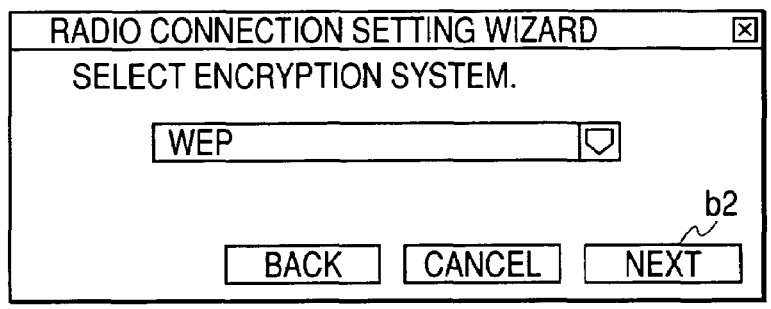
Figure 12C:
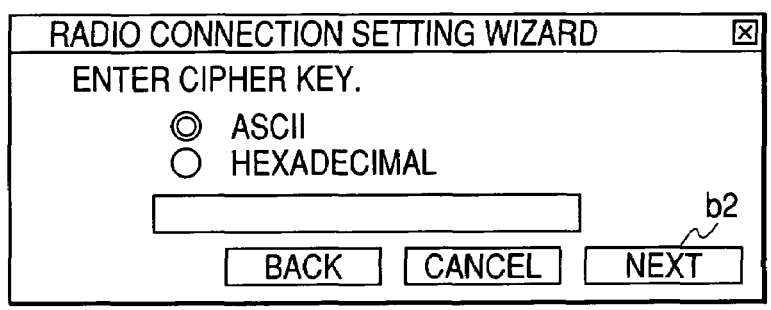
Figure 12D:
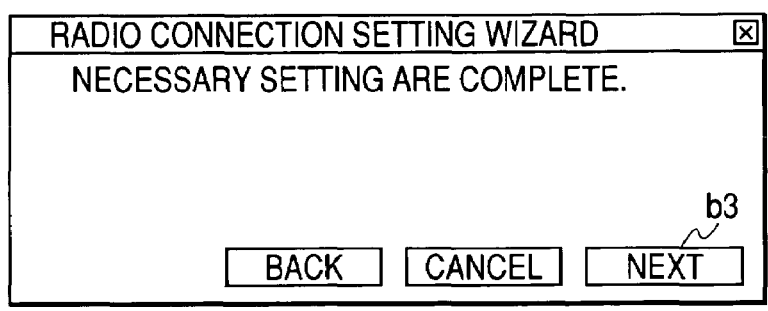

If the setup state indicated by the setup state data is sufficient setup state (YES at1090), the user is notified that connection with access point is normally established in the printer 20 (s1110) and then the remote setup processing is terminated. At s1110, an image indicating that connection with access point is normally established in the printer 20 is displayed on the display, as shown in FIG. 12D.

Although s1020 to s1100 are repeated and the state request data for the first to i-1st setting images is transmitted in order, if the setup state data indicating the sufficient setup state is not transmitted, the value n of the variable N reaches the number of setting images, i, at s1020 described above.

Figure 12E:
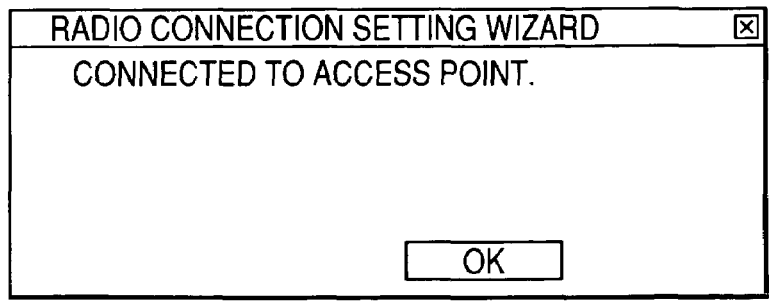

If the value n of the variable N thus reaches the number of setting images, i, (YES at s1020), the i-th setting image as shown in FIG. 12E is displayed on the display (s1120). After the i-th setting image is displayed, the user can select a CONNECT button b3 by operating the operation section of the keyboard, the mouse, etc.

Next, the CP 30, 40 waits until the user selects the CONNECT button b3 (NO at s1130). When the user selects the CONNECT button b3 (YES at s1130), state request data is transmitted to the printer 20 (s1140). This step is similar to s1070.

Next, the PC 30, 40 waits until reception of the connection state data, the setup state data from the printer 20 (NO at s1150). Upon reception of the data (YES at s1150), the PC 30, 40 notifies the user of the connection state indicated by the connection state data, the setup state indicated by the setup state data (s1160). This step is similar to s950 in FIG. 9.

[Advantages of the Second Embodiment]

In the second embodiment, the printer 20 and the PCs 30 and 40 can provide the following advantages in addition to those provided by a similar configuration to that of the first embodiment:

According to the PC 30, 40 in the second embodiment, as the remote setup processing is performed, a plurality of setup items required for the printer 20 to establish connection with an access point or a radio station can be set in order. At this time, the user of the PC 30, 40 can set the setup items in order by operating the PC 30, 40 and each time, the user can check whether or not connection is normally established depending on whether or not the user is notified that connection with access point is normally established in the printer 20 at s1110.

If connection is not normally established although the user sets all the setup items required for the printer 20 to establish connection with an access point or a radio station, the user can be notified of the state at s1160.

If the user is notified of the state at s1160 before completion of setting all the setup items, input of the settings is terminated, so that it is made possible to establish connection by the minimum settings.

Third Embodiment

A network configuration of a third embodiment of the invention is similar to that of the first embodiment; they differ in configurations of some devices and processing procedure and therefore only the difference will be discussed in detail.

Figure 13A:
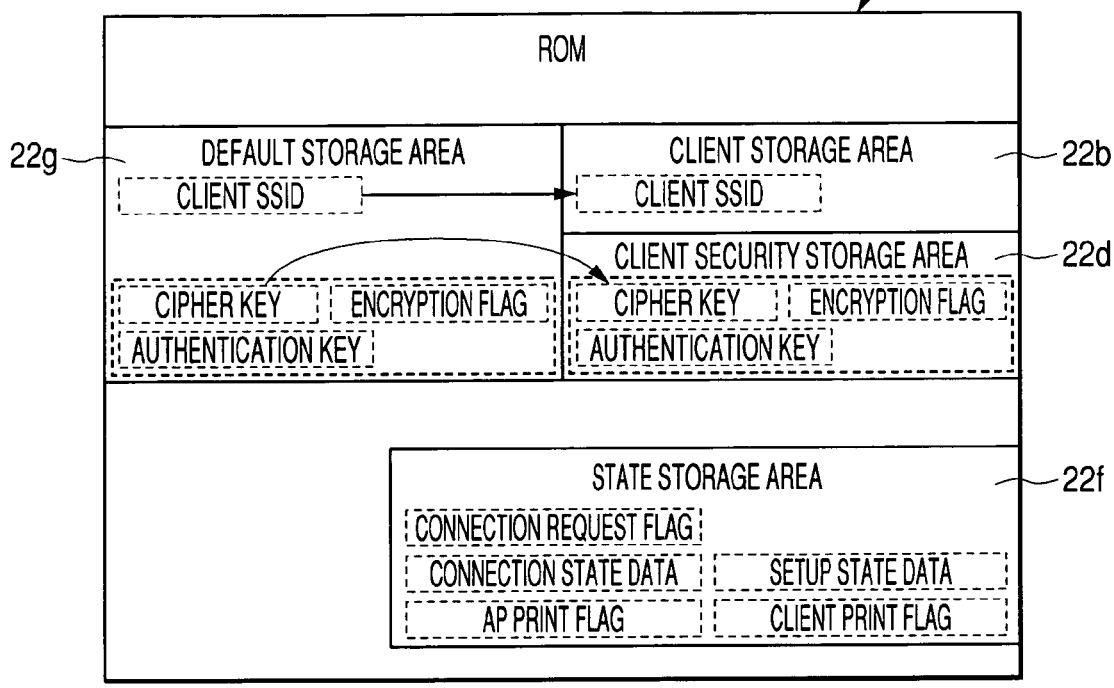
FIGS. 13A and 13B are drawings to show storage areas in ROM of a printer and ROM of a PC in a third embodiment of the invention.

A printer 20 is a device having a wireless LAN controller 24 implemented only as a portion corresponding to a client function section and functioning only as a radio station. Thus, ROM 22 does not involve an AP storage area, an AP security storage area, or an authentication storage area as shown in FIG. 13A, and the printer 20 does not perform processing involved in an access point (AP function processing). The ROM 22 has a default storage area 22g recording setup items for establishing connection with a wireless network that can be established by a PC 30 as an access point (client SSID, cipher key, encryption flag, and authentication key) as default setup items at factory shipment.

Figure 13B:
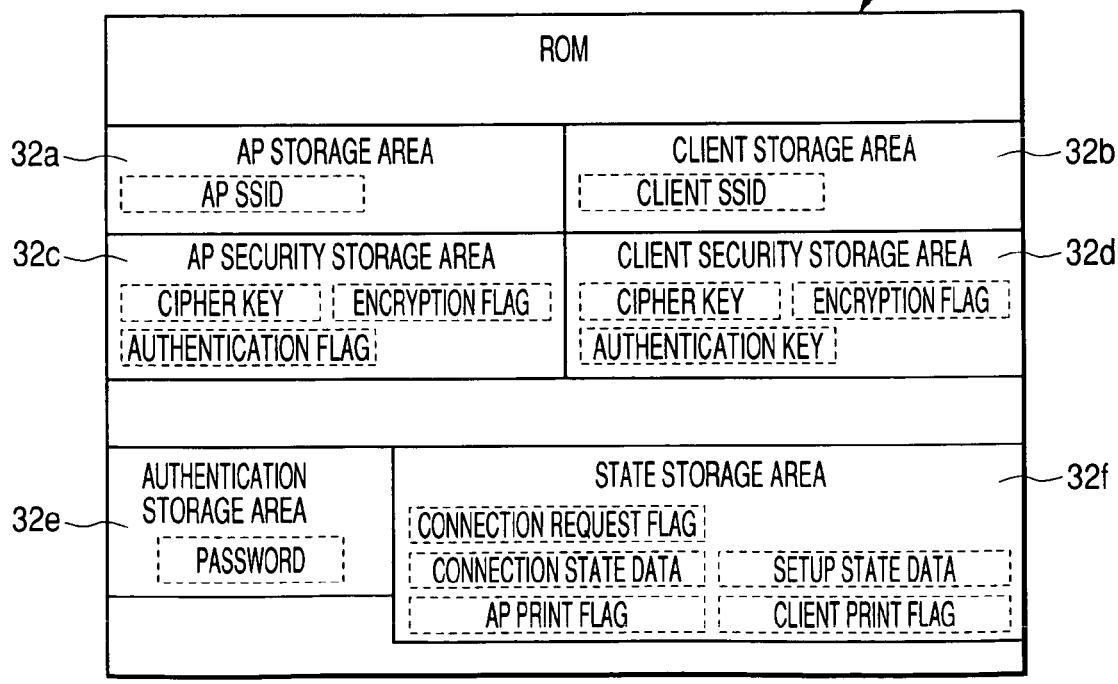
Figure 14:
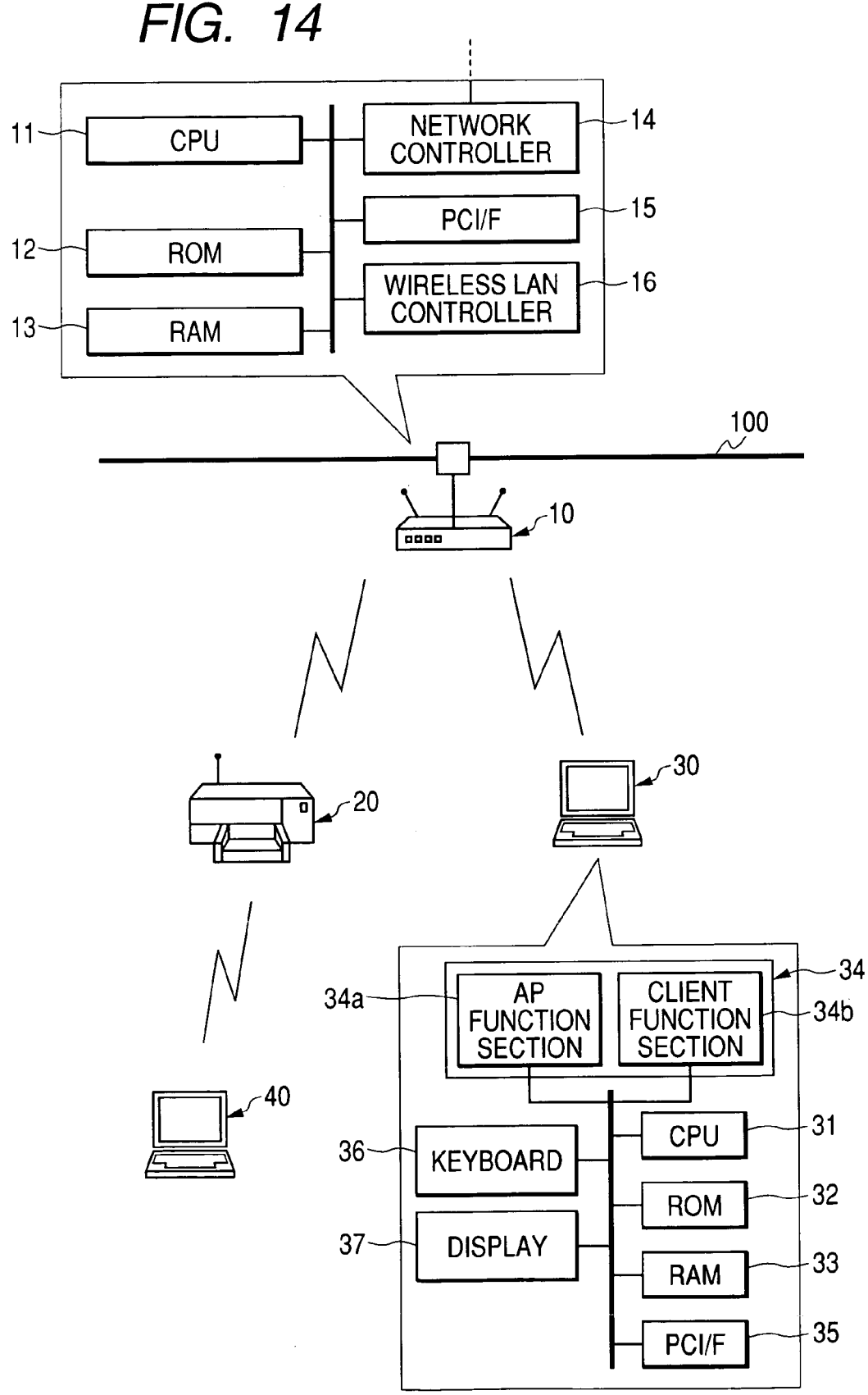
FIG. 14 is a drawing to show the network configuration in the third embodiment of the invention.

The PC 30 is a device usually functioning as a radio station and is a known computer system made up of a CPU 31, ROM 32, RAM 33, a PC interface section (PC I/F) 35, a key board 36, and a display 37 to which a wireless LAN controller 34 similar to that of the printer 20 in the first embodiment is added, as shown in FIG. 14. The ROM 32 involves storage areas similar to those of the printer 20 in the first embodiment (AP storage area 32a, client storage area 32b, AP security storage area 32c, client security storage area 32d, authentication storage area 32e, and state storage area 32f) as shown in FIG. 13B. The CPU 31 controls the wireless LAN controller 34 based on the records in the storage areas, whereby communication functions not only as radio station, but also as access point are provided.

<AP Function Processing of PC 30>

A processing procedure of the AP function processing executed by the CPU 31 of the PC 30 will be discussed with FIG. 15. The AP function processing is processing for controlling communications of an AP function section 34a of the wireless LAN controller 34, and is repeatedly executed after the PC 30 is started.

First, the CP 30 waits until it receives a connection request (is accessed) from a radio station (for example, the printer 20) (NO at s1210). Upon reception of a connection request (YES at s1210), whether or not connection with the radio station making the connection request may be established is checked (s1220). This step is similar to s1150 in FIG. 4.

If it is determined that connection with the radio station is not to be established (NO at s1220), the process returns to s1210 without establishing connection. On the other hand, if it is determined that connection with the radio station may be established (YES at s1220), connection with the radio station is established (s1230). This step is similar to s160 in FIG. 4.

Next, whether or not data has been received from the radio station is checked (s1240).

If data has been received (YES at s1240), whether or not the data is a disconnection request is checked (s1250).

If the received data is not a disconnection request (NO at s1250), whether or not the received data is a setting request is checked (s1260). The setting request is data transmitted from the radio station establishing connection at s1230 and is data for requesting setup items for the PC 30 as a radio station to establish connection with the access point 10.

If the received data is a setting request (YES at s1260), setup data is stored in the RAM 33 (s1270). At the step, the data indicating all records in the client storage area 32*b* and the client security storage area 32*d* (client SSID, cipher key, encryption flag, and authentication key), the setup items for the PC 30 to establish connection with the access point is stored in the RAM 33 as the setup data in association with the radio station establishing connection at s1230. The setup data stored in the RAM 33 is transmitted to the radio station at s1300 described later.

On the other hand, if the received data is not a setting request (NO at s1260), processing corresponding to the received data is performed (s1280). This step is similar to s190 in FIG. 4.

After s1270 or s1280 is thus executed, whether or not the data to be transmitted to the radio station exists is checked (s1290).

If the data to be transmitted does not exist (NO at s1290), the process returns to s1240. On the other hand, if the data to be transmitted exists (YES at s1290), the data is transmitted to the radio station (s1310) and then the process returns to s1240.

After s1240 to s1300 are thus repeated, if the data received as s1240 is a disconnection request (YES at s1250), the connection with the radio station is cut off (s1310) and then the process returns to s1210. The step s1310 is similar to s220 in FIG. 4.

<Client Function Processing of PC 30>

A processing procedure of the client function processing executed by the CPU 31 of the PC 30 will be discussed with FIG. 16. The client function processing is processing similar to that executed by the printer 20 in the first embodiment. After s400, s410, processing peculiar to the third embodiment is performed and therefore only the peculiar processing will be discussed in detail. In parts of similar processing in the third embodiment to the client function processing in the first embodiment previously described with reference to FIG. 3, FIG. 6, etc., the printer 20, the client storage area 22*b*, and the state storage area 22*f* in the first embodiment are replaced with the PC 30, the client storage area 32*b*, and the state storage area 32*f* respectively in the third embodiment.

First, after s410 or if the data to be transmitted does not exist (NO at s400), whether or not setup data is stored in the RAM 33 is checked (s412). The setup data is data stored in the RAM 33 at s1270 in the AP function processing previously described with reference to FIG. 15.

If setup data is stored (YES at s412), a connection test is conducted for the radio station transmitting the setup data (s416). In the embodiment, print data for test print is transmitted to the printer 20, whereby whether or not connection with the printer 20 is normally established is checked. After this, if an image indicated by the print data is normally printed on the printer 20, it section that settings based on the setup data in the printer 20 are normally made. At s416, after the connection test is conducted, the setup data is deleted from the RAM 33.

After s416 or if setup data is not stored (NO at s412), the process goes to s420.

<Client Function Processing of printer 20>

A processing procedure of the client function processing executed by the CPU 21 of the printer 20 will be discussed with FIG. 17. The client function processing in the third embodiment is processing similar to the client function processing in the first embodiment (FIG. 6). Before s310, the following processing is performed:

First, whether or not the printer 20 is in default state is checked (s301). At the step, if a setup item is not stored in any storage area other than the default storage area 22*g* in the ROM 22, it is determined that the printer 20 is in the default state. In the embodiment, if the printer 20 is started first after it is manufactured or if the printer 20 is restored to the default state, a setup item is not stored in any storage area other than the default storage area 22*g* in the ROM 22 and therefore if a setup item is not stored in any storage area other than the default storage area 22*g*, it can be determined that the printer 20 is in the default state.

If the printer 20 is not in the default state (NO at s301), namely, if setup items are stored in the ROM 22, the process goes to s310.

On the other hand, if the printer 20 is in the default state (YES at s301), the printer 20 is set to a state in which connection with an access point can be established according to the default setup items (s302). At the step, the setup items stored in the default storage area 22*g*, namely, the setup items for establishing connection with the wireless network that can be established by the PC 30 are stored in the client storage area 22*b* and the client security storage area 22*d*.

Next, a connection request is transmitted (s303). At the step, a connection request as a radio station is transmitted to the PC 30 based on the setup items set at s302.

Next, whether or not connection with the PC 30 is established is checked (s304). At the step, as at s320, if data to start communications is received from the PC 30 within a predetermined time after the connection request was transmitted at s303, it is determined that connection with the PC 30 is established.

If connection with the PC 30 cannot be established (NO at s304), the user is notified of the fact (s305) and then the client function processing is terminated. At s305, a message to the effect that connection with the PC 30 cannot be established is displayed on a display panel 27. At s305, a message may be printed by a print engine 28 as well as displayed on the display panel 27.

On the other hand, if connection with the PC 30 can be established (YES at s304), a setting request is transmitted (s306). At the step, data for requesting setup data indicating setup items for the PC 30 to establish connection with the access point is transmitted to the PC 30. In the PC 30 receiving the setting request, the setup data is stored in the RAM 33 at s1270 in the AP function processing previously described with reference to FIG. 15 and then is transmitted at s1300 in the AP function processing (FIG. 15).

Next, the printer 20 waits until reception of the setup data from the PC 30 (NO at s307). Upon reception of the setup data (YES at s307), the setup items indicated by the setup data are set (s308) and then the process goes to s350. At s308, as the setup items indicated by the setup data, the client SSID is again stored in the client storage area 22*b* and the cipher key, the encryption flag, and the authentication key are again stored in the client security storage area 22*d*. The setup items for the PC 30 to establish connection with the access point are thus set in the printer 20, so that it is made possible for the printer 20 to communicate with the PC 30 through the same access point.

[Advantages of the Third Embodiment]

In the third embodiment, the printer 20 and the PCs 30 and 40 can provide the following advantages in addition to those provided by a similar configuration to that of the first embodiment:

According to the printer 20 in the third embodiment, after the printer 20 connects to the wireless network established by the PC 30 with the AP function section 34*a*, the printer 20 receives setup data from the PC 30, whereby the setup items indicated by the setup data can be set (remotely set up).

As a setting request is transmitted at s306 in FIG. 17, a request to transmit setup data can be made, so that settings based on the setup data can be made at the timing at which the setting request is transmitted.

Figure 15:
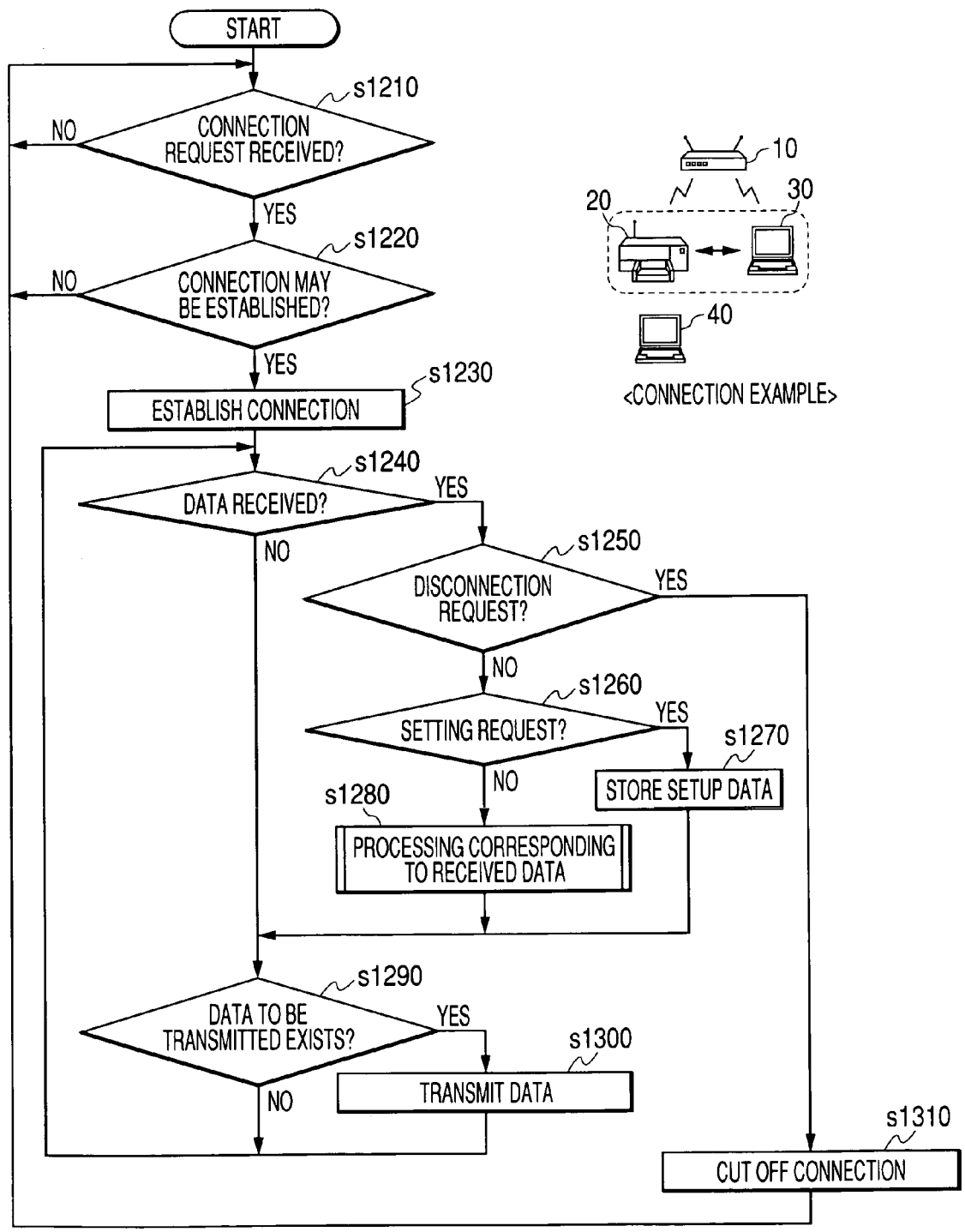
FIG. 15 is a flowchart to show a processing procedure of AP function processing performed by PC in the third embodiment of the invention.

According to the PC 30 in the embodiment, the printer 20 can be caused to make similar settings to the setup items for the PC 30 to establish connection with the radio station according to the setup data transmitted at s1300 in FIG. 15.

Figure 16:
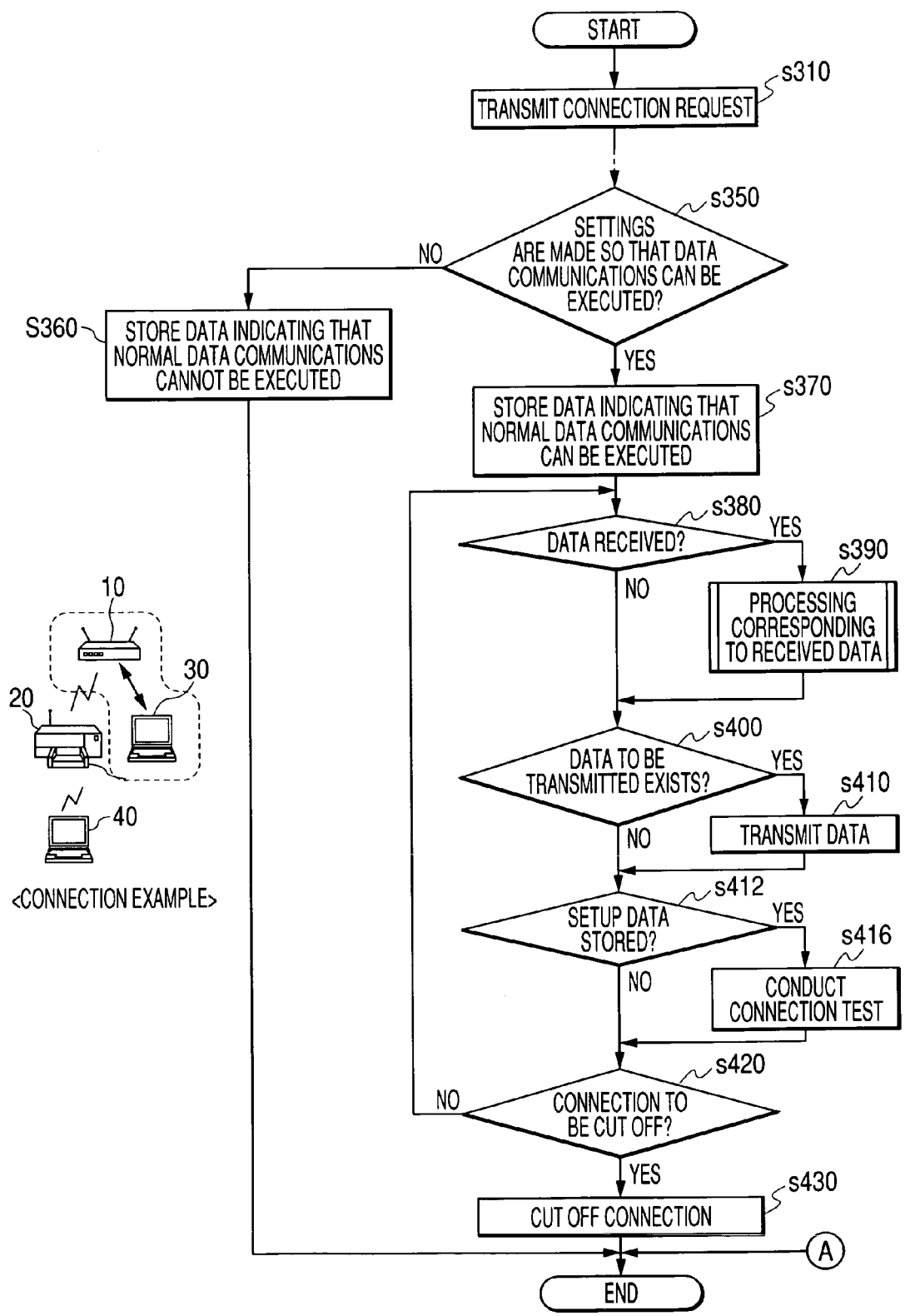
FIG. 16 is a flowchart to show a processing procedure of client function processing performed by PC in the third embodiment of the invention.

After the setup data is transmitted at s1300 in FIG. 15 for causing the printer 20 to make settings, a connection test is conducted at s416 in FIG. 16, whereby whether or not the printer 20 normally makes similar settings to the setup items for the PC 30 to establish connection with the radio station can be checked.

After the setup data is stored in the RAM 33 at s1270 in response to the setting request received at s1260 in FIG. 15, the setup data is transmitted at s1300, whereby the printer 20 can be caused to set the setup items indicated by the setup data.

[Modifications]

Although the invention has been described based on the embodiments, it is to be understood that the invention is not limited to the specific embodiments thereof and can be embodied in various forms. For example, in the embodiments, the printer 20 is applied as the radio station of the invention by way of example. However, any device other than the printer 20 can also be applied as the radio station of the invention if the device functions as a radio station.

In the embodiment, the printer 20 does not perform sending the SSID (one of the access point functions) while connection with an access point is established in the SSID sending processing in FIG. 5 by way of example. However, for example, execution of the AP function processing in FIG. 4 may be skipped while connection with an access point is established.

In the embodiment, if print data is being received at s670 in FIG. 7 or s820 in FIG. 8, settings based on the setup data are not made by way of example. However, if print data is being received at the step, the printer 20 may wait until reception of the print data is complete and then settings based on the setup data may be made.

In the embodiment, when connection with the access point 10 is established at s110 in FIG. 4, the security measures taken for communications with the access point (authentication and cipher key) are also applied to communications with the wireless network established by the printer 20 as access point by way of example. However, connection of a radio station to the wireless network established by the printer 20 as access point may be made without taking any security measures. In this case, the radio station can easily establish connection with the wireless network established by the printer 20 as access point simply by setting the AP SSID.

In the embodiment, the authentication system based on the password stored in the access point is adopted as the authentication system, one of security measures, by way of example. However, for example, authentication system based on the user name and the ID (stipulated by IEEE 802.1x standard), authentication system to check the identification number (MAC address) unique to each radio station (MAC address filtering), etc., may be adopted as the authentication system.

In the embodiment, the WEP key is adopted as the cipher key used with encrypted communications, one of security measures, by way of example. However, for example, a cipher key defined in an encryption system such as TKIP (Temporal Key Integrity Protocol), AES (Advanced Encryption Standard), or WEPplus may be adopted as the cipher key.

In the embodiment, when the printer 20 receives terminal setup data by the access point function at s510 in FIG. 7, if the printer 20 is receiving print data by the radio station function, settings based on the terminal setup data are skipped, by way of example. However, when the printer 20 is receiving print data by the radio station function, if reception of data by the access point function is skipped, similar advantages can be provided.

Likewise, when the printer 20 receives relay setup data by the radio station function at s710 in FIG. 8, if the printer 20 is receiving print data by the access point function, settings based on the relay setup data are skipped, by way of example. However, when the printer 20 is receiving print data by the access point function, if reception of data by the radio station function is skipped, similar advantages can be provided.

In the third embodiment, after a connection test is conducted at s416 in FIG. 16, the process goes to s420 by way of example. However, the result of the connection test conducted at s416 may be checked and if settings in the printer 20 are not normally made, the process may return to s414 for conducting a connection test.

In the third embodiment, at s416 in FIG. 16, print data for test print is transmitted to the printer 20 and the user is notified of the connection test result depending on whether or not an image indicated by the print data is normally printed on the printer 20, by way of example. However, the connection test can also be conducted in another way and the user can also be notified of the connection test result in another way. For example, whether or not access simply through an access point is possible may be only checked and the check result may be displayed on the display 37.

[Component Correspondence in the Invention]

In the printer 20 in the embodiments described above, the AP function section 24a and the CPU 21 are an AP function section; the client function section 24b and the CPU 21 are a client function section; the CPU 21 is an operation control section; and the print engine 28 is a print section. In the ROM 22, the AP storage area 22a is an AP storage section, and the AP SSID stored therein is a network identification information. The client storage area 22b is a client storage section, and the client SSID stored therein is a client identification information.

Step S120 in FIG. 4 is a synchronization authentication section and a synchronization encryption section.

Steps S580, s640, and s680 in FIG. 7 and steps s730, s790, and s830 in FIG. 8 are a processing execution section, and the state data transmitted at step s580 or s730 is a result signal.

Figure 11:
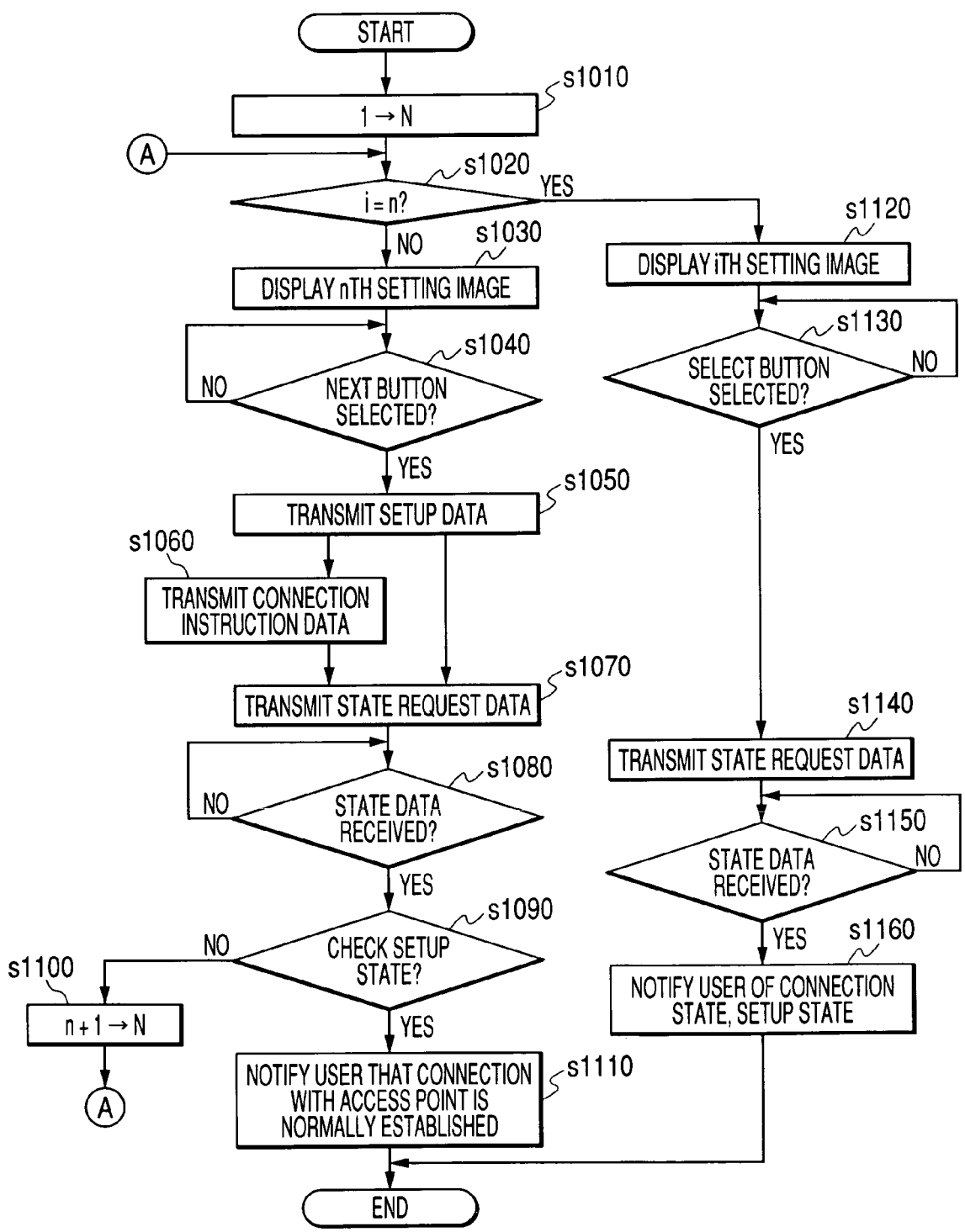
FIG. 11 is a flowchart to show a processing procedure of remote setup processing in the second embodiment of the invention.

In the PCs 30 and 40, steps s910 and s930 in FIG. 9, steps s1050, s1070, and s1140 in FIG. 11, and application software for transmitting print data are what the radio station transmits an instruction signal, and the setup data, the state request data, and the print data transmitted at the steps and by the application software are an instruction signal. Steps s950, s1110, and s1160 are a notification section.

In the PC 30, the AP function section 34a and the CPU 31 are an AP function section; the client function section 34b and the CPU 31 are a client function section; and the CPU 31 is an operation control section. In the ROM 32, the AP storage area 32a is an AP storage section, and the AP SSID stored therein is a network identification information. The client storage area 32b is a client storage section, and the client SSID stored therein is a client identification information.

Step s1300 in FIG. 15 is a first instruction transmission section and the setup data transmitted at the step is an instruction signal. Step s416 is a connection test section.

Step s306 in FIG. 17 is a request transmission section, and step s308 is a processing execution section.

In the radio station, the operation control section simultaneously controls the operation of the AP function section and the operation of the client function section and may always operate both the section simultaneously. However, for example, the operation of the AP function section may be stopped at least while the radio station connects with the wireless network by the client function section.

Therefore, the AP function section does not transmit and receive a signal required for establishing a wireless network while the radio station connects with the wireless network by the client function section. Thus, the signal can be prevented from having some adverse effect (for example, interference, a decrease in the communication speed, etc.,) on data communications of the client function section.

In the radio station, the operation control section stops the operation of the AP function section while the radio station connects with the wireless network by the client function section. The expression "stops the operation" may be to stop at least a part of operations of the AP function section, for example. Specifically, if the AP function section transmits network identification information to another radio station at a predetermined timing to establish a wireless network, it may be possible to stop transmitting the network identification information.

By the way, if the radio station is designed for providing a specific function (providing a specific service) through a wireless network, the radio station can also be used for enabling another radio station to use the function that can be provided by the radio station (service that can be provided by the radio station) directly not via wireless network.

To do this, the radio station may further has a processing execution section that executes a predetermined processing when the radio station receives an instruction signal for instructing the radio station to execute the predetermined processing through the second wireless network.

Therefore, another radio station connects to the wireless network established by the radio station with the AP function section and provides an instruction to the radio station for to carry out the function thereof, whereby the another radio station can use the function that can be provided by the radio station (service that can be provided by the radio station) directly not via wireless network.

Thus, if another radio station connects to the wireless network established by the radio station with the AP function section, the function that can be provided by the radio station can be used not via the wireless network with which connection is established by the radio station with the client function section, namely, can be used by a radio station which is not an authorized radio station set so as to be able to establish connection with the wireless network.

There is also a possibility that a radio station which is not an authorized station may be operated by a malicious user trying to make unauthorized access to the wireless network, etc. Such circumstances where a radio station can easily connect to the wireless network are detrimental to security. Thus, as the function of the radio station can be used not via the wireless network with which connection is established by the radio station with the client function section as described above, for example, even if a radio station other than authorized radio stations, operated by a guest user is allowed to use the function, security of the wireless network is not degraded.

A setting function for making settings for the radio station to establish connection with an access point is possible as the function provided as the processing execution section executes processing, for example. To provide such a setting function, the radio station may be configured as follows.

In the radio station, if the instruction signal involves setup information required for establishing connection with the first wireless network, the processing execution section records the setup information in the client storage section.

Therefore, settings required for establishing connection with the wireless network (remote setup) can be made indirectly by the client function section via the wireless network established by the AP function section.

Particularly, the radio station can also function as an access point while providing the essential function of the radio station and therefore settings for establishing connection with the wireless network established by the AP function section in the infrastructure mode needs only to be made for the radio station for executing remote setup. Thus, even if the radio station used in the infrastructure mode is used for remote setup, the radio station need not be switched into the ad hoc mode and expense in time and effort required for remote setup can be decreased.

In the radio station, when the setup information is recorded in the client storage section, the operation control section may control the client function section so as to try to connect to the first wireless network, and may control the AP function section so as to transmit a result signal indicating a trial result to the radio station transmitting the instruction signal.

Therefore, after settings required for establishing connection with the wireless network (remote setup) are made indirectly by the client function section via the wireless network established by the AP function section, whether or not connection to the wireless network can be normally established according to the settings can be checked on the result signal data in the another station of the party transmitting the instruction signal.

When the radio station establishes connection with another wireless network by the client function section, if settings based on the instruction signal are made, communications with the wireless network already established are suddenly interrupted. Thus, if the radio station provides a specific function via the wireless network, when processing for providing the function via the wireless network is executed, if interruption of communications described above occurs, it is feared that the radio station may be adversely affected because the function being provided becomes incomplete.

Then, to circumvent such a problem, in the radio station, if the instruction signal involves setup information required for establishing connection with the first wireless network, the processing execution section records the setup information in the client storage section only when the processing execution section does not execute any processing other than recording the setup information in the client storage section.

Therefore, when the processing execution section makes settings with connection with another wireless network established by the client function section, if processing for providing a function other than the settings is being executed, the settings are not made. Thus, communications with the wireless network already established are not suddenly interrupted, and adversely affecting the radio station because the function being provided becomes incomplete can be prevented.

If processing for providing a function other than the settings is being executed, the settings may be skipped; however, the settings may be made after completion of the processing being executed.

If the radio station includes a print section that prints an image, a print function for printing an image by the print section is possible as the function provided as the processing execution section executes processing. To provide such a print function, the radio station may be configured as follows.

In the radio station, the radio station further has a print section that prints an image in response to an instruction from the processing execution section, wherein if the instruction signal is a signal for instructing to print a predetermined image, the processing execution section instructs the print section to print the predetermined image.

Therefore, printing an image by the print section can be executed indirectly via the wireless network connected by the AP function section.

The radio station further has a first instruction transmission section that transmits an instruction signal for instructing another radio station connected to the second wireless network to execute a predetermined processing.

Therefore, the instruction signal transmitted by the first instruction transmission section can cause the another radio station to execute processing for providing the function.

In the radio station, the instruction signal involves setup information required for establishing connection with a predetermined wireless network and is a signal for instructing to make settings based on the setup information. In this case, another wireless network can be caused to make settings based on the predetermined wireless network.

In the radio station, the instruction signal involves setup information required for establishing connection with the first wireless network and is a signal for instructing to make settings based on the setup information. In this case, another wireless network can be caused to make settings for the radio station to connect to a wireless network that can be connected by the client function section.

The radio station further has a connection test section that tries to communicate with the another radio station through the second wireless network after the first instruction transmission section transmits the instruction signal to the another radio station.

Therefore, the another radio station can check whether or not the radio station can normally establish connection with the wireless network that can be connected by the client function section.

If communications cannot be conducted in checking the connection, the connection test section may again transmit the same instruction data.

In the radio station, when the radio station receives a request signal for requesting to transmit the instruction signal from the another radio station through the second wireless network, the first instruction transmission section transmits the instruction signal.

Therefore, another radio station can be caused to execute processing for providing a function in response to a request from another radio station.

By the way, if connection of another radio station to the wireless network established by the AP function section is made without any authentication, the another radio station can easily establish connection with the wireless network established by the AP function section simply by setting network identification information (storing network identification information in memory corresponding to the AP storage section). However, if communications with a wireless network connected by the client function section are conducted with authentication according to a predetermined authentication system, connection of another radio station to the wireless network established by the AP function section may be made with any authentication to provide security.

To do this, the radio station further has a synchronization authentication section that conducts authentication by a predetermined authentication system in also conducting communications through the second wireless network if setting is made so as to conduct authentication by the predetermined authentication system in conducting communications through the first wireless network.

Therefore, similar security to that of communications with wireless network connected by the client function section can also be provided by conducting authentication for connection of another radio station to the wireless network established by the AP function section.

Connection of another radio station to the wireless network established by the AP function section can be made with authentication according to an authentication system similar to that of communications with wireless network connected by the client function section without any setting for conducting authentication.

The synchronization authentication section may always connect another radio station to the wireless network established by the AP function section with authentication according to an authentication system similar to that of communications with wireless network connected by the client function section. Also, only at a specific timing, the synchronization authentication section may connect another radio station to the wireless network with authentication according to an authentication system similar to that of communications with wireless network. In this case, in the radio station, the synchronization authentication section conducts the authentication in conducting communications through the second wireless network only while the radio station is connected with the first wireless network.

Therefore, communications with a wireless network established by the AP function section can also be conducted with authentication only while the radio station is connected to the wireless network by the client function section.

As with the authentication described above, if connection of another radio station to the wireless network established by the AP function section (communications with radio station) is made without any encryption, the another radio station can easily establish connection with the wireless network established by the AP function section simply by setting network identification information. However, also in this case, if communications with a wireless network connected by the client function section are conducted in an encryption state with a predetermined cipher key, connection of another radio station to the wireless network established by the AP function section may be made in an encryption state with some cipher key to provide security.

To do this, the radio station further has an encryption section that conducts encryption with a predetermined cipher key in also conducting communications through the second wireless network if setting is made so as to conduct encryption using the predetermined cipher key in conducting communications through the first wireless network.

Therefore, as encrypted communications are conducted, similar security to that of communications with a wireless network connected by the client function section can also be provided for connection of another radio station to the wireless network established by the AP function section.

Connection of another radio station to the wireless network established by the AP function section can be made in an encryption state with a cipher key similar to that in communications with a wireless network connected by the client function section without any setting to conduct communications in an encryption state.

The synchronization encryption section may also connect another radio station to the wireless network established by the AP function section always in an encryption state with a cipher key similar to that in communications with a wireless network connected by the client function section. Also, only at a specific timing, the synchronization authentication section may connect another radio station to the wireless network in an encryption state with a cipher key similar to that in communications with a wireless network connected by the client function section. In this case, in the radio station, the encryption section conducts the encryption in conducting communications through the second wireless network only while the radio station is connected with the first wireless network.

Therefore, communications with a wireless network established by the AP function section can also be conducted in an encryption state only while the radio station is connected with the wireless network by the client function section.

In the radio station, the instruction signal involves setup information required for establishing connection with the first wireless network, and the radio station has: a result reception section that receives a result signal indicating a result of trying to connect to the first wireless network from the another radio station; and a notification section that reports the result indicated by the result signal.

The radio station enables the user to check whether or not the another radio station can establish normal connection with the wireless network by the client function section on the report provided by the notification section.

In the radio station, the radio station transmits an instruction signal involving a plurality of setup information required for establishing connection with the first wireless network in order.

Therefore, the settings required for connecting to the wireless network can be set in order.

The radio station transmits an instruction signal in order. If the radio station includes an input section with which a user of the radio station enters the plurality of setup information required for connecting to the wireless network in order, for example, the radio station transmits the instruction signal involving the setup information every time the setup information is entered through the input section.

Therefore, the user of the radio station can make settings based on the instruction data in order by operating the radio station and each time, the user can check whether or not connection with the wireless network is normally made according to the setting.

If the user is notified that normal connection with the wireless network is made before completion of making all settings, additional settings need not be made. Thus, the user acknowledges the notification and terminates input of the settings, so that it is made possible to make connection with the wireless network by the minimum settings.

A setting function for making settings for the radio station to establish connection with an access point is possible as the function provided as the processing execution section executes processing. To provide such a setting function, the radio station may be configured as follows.

In the radio station, if the instruction signal involves setup information required for establishing connection with the first wireless network, the processing execution section records the setup information in the client storage section.

Therefore, settings required for establishing connection with the predetermined wireless network (remote setup) can be made indirectly from the another radio station.

If the radio station as the party transmitting the instruction signal transmits the instruction signal at the timing at which a request for transmitting an instruction signal is received, the radio station may have a request signal transmission section that transmits a request signal for requesting to transmit the instruction signal through the second wireless network.

Therefore, as request data is transmitted, a request to transmit instruction data can be made. Thus, setting based on the instruction signal can be made at the request signal transmission timing.

In the operation control method, the operation of the AP function section may be stopped at least while the radio station connects with the wireless network by the client function section.

The radio station controlled by the operation control method can provide similar advantages to those of the radio station.

In the operation control method, a predetermined processing is executed when the radio station receives an instruction signal for instructing the radio station to execute the predetermined processing through the second wireless network.

The radio station controlled by the operation control method can provide similar advantages to those of the radio station.

In the operation control method, if the instruction signal involves setup information required for establishing connection with the first wireless network, the setup information is recorded in the client storage section.

The radio station controlled by the operation control method can provide similar advantages to those of the radio station.

In the operation control method, when the setup information is recorded in the client storage section, the client function section is controlled so as to try to connect to the first wireless network, and the AP function section is controlled so as to transmit a result signal indicating a trial result to the radio station transmitting the instruction signal.

The radio station controlled by the operation control method can provide similar advantages to those of the radio station.

In the operation control method, if the instruction signal involves setup information required for establishing connection with the first wireless network, the setup information is recorded in the client storage section only when any processing other than recording the setup information in the client storage section is not executed.

The radio station controlled by the operation control method can provide similar advantages to those of the radio station.

In the operation control method, when the radio station includes a print section that prints an image, if the instruction signal is a signal for instructing to print a predetermined image, the processing execution section instructs the print section to print the predetermined image.

The radio station controlled by the operation control method can provide similar advantages to those of the radio station.

In the operation control method, an instruction signal for instructing another radio station connected to the second wireless network to execute a predetermined processing is transmitted. Further, the instruction signal involves setup information required for establishing connection with a predetermined wireless network and is a signal for instructing to make settings based on the setup information. Further, the instruction signal involves setup information required for establishing connection with the first wireless network and is a signal for instructing to make settings based on the setup information.

The radio station controlled by the operation control method can provide similar advantages to those of the radio station.

In the operation control method, a test for communicating with the another radio station through the second wireless network is carried out after the first instruction transmission section transmits the instruction signal to the another radio station.

The radio station controlled by the operation control method can provide similar advantages to those of the radio station.

In the operation control method, when the radio station receives a request signal for requesting to transmit the instruction signal from the another radio station through the second wireless network, the instruction signal is transmitted.

The radio station controlled by the operation control method can provide similar advantages to those of the radio station.

In the operation control method, authentication by a predetermined authentication system is conducted in also conducting communications through the second wireless network if setting is made so as to conduct authentication by the predetermined authentication system in conducting communications through the first wireless network.

The radio station controlled by the operation control method can provide similar advantages to those of the radio station.

In the operation control method, the authentication is conducted in conducting communications through the second wireless network only while the radio station is connected with the first wireless network.

The radio station controlled by the operation control method can provide similar advantages to those of the radio station.

In the operation control method, encryption with a predetermined cipher key is conducted in also conducting communications through the second wireless network if setting is made so as to conduct encryption using the predetermined cipher key in conducting communications through the first wireless network.

The radio station controlled by the operation control method can provide similar advantages to those of the radio station.

In the operation control method, the encryption is conducted in conducting communications through the second wireless network only while the radio station is connected with the first wireless network.

The radio station controlled by the operation control method can provide similar advantages to those of the radio station.

In the operation control method, the instruction signal involves setup information required for establishing connection with the first wireless network, and a result signal indicating a result of trying to connect to the first wireless network transmitted from the another radio station is received; and the result indicated by the result signal is reported.

The radio station controlled by the operation control method can provide similar advantages to those of the radio station.

In the operation control method, an instruction signal involving a plurality of setup information required for establishing connection with the first wireless network is transmitted in order from the radio station. Further, a user of the radio station enters the plurality of setup information in order, and the instruction signal involving the setup information is transmitted from the radio station every time the setup information is entered through the input section.

The radio station controlled by the operation control method can provide similar advantages to those of the radio station.

What is claimed is:

1. A radio station to be connected to a first wireless network through an access point, comprising:
   an AP storage section that stores network identification information indispensable for grouping subjects of communication in a wireless network;
   an AP function section that establishes connection with a second wireless network based on the network identification information stored in the AP storage section;
   a client storage section that stores client identification information used in connecting to the first wireless network;
   a client function section that establishes connection with the first wireless network based on the client identification information stored in the client storage section;
   an operation control section that simultaneously controls operation of the AP function section and operation of the client function section;
   a connection determination section that determines whether the connection with the first wireless network by the client function section is established; and
   a synchronization authentication section that conducts authentication by a predetermined authentication system, the predetermined authentication system configured to conduct communications through the second wireless network when the predetermined authentication system conducts communications through the first wireless network,
   wherein the client storage section has a capacity to store security information concerning the predetermined authentication system used in the communications through the first wireless network,
   wherein the synchronization authentication section is configured to copy the security information stored in the client function section into the AP storage section subject to the connection determination section determining the connection with the first wireless network being established, and
   wherein the AP function section establishes the connection with the second wireless network based on the security information stored in the AP storage section.

2. The radio station according to claim 1,
   wherein the operation control section stops the operation of the AP function section while the radio station connects with the first wireless network.

3. The radio station according to claim 1, further comprising:
   a processing execution section that executes a predetermined processing when the radio station receives an instruction signal for instructing the radio station to execute the predetermined processing through the second wireless network.

4. The radio station according to claim 3,
wherein if the instruction signal involves setup information required for establishing connection with the first wireless network, the processing execution section records the setup information in the client storage section.

5. The radio station according to claim 4,
wherein when the setup information is recorded in the client storage section, the operation control section controls the client function section so as to try to connect to the first wireless network, and controls the AP function section so as to transmit a result signal indicating a trial result to the radio station transmitting the instruction signal.

6. The radio station according to claim 4,
wherein if the instruction signal involves setup information required for establishing connection with the first wireless network, the processing execution section records the setup information in the client storage section only when the processing execution section does not execute any processing other than recording the setup information in the client storage section.

7. The radio station according to claim 3, further comprising:
a print section that prints an image in response to an instruction from the processing execution section,
wherein if the instruction signal is a signal for instructing to print a predetermined image, the processing execution section instructs the print section to print the predetermined image.

8. The radio station according to claim 1, further comprising:
a first instruction transmission section that transmits an instruction signal for instructing an other radio station connected to the second wireless network to execute a predetermined processing.

9. The radio station according to claim 8,
wherein the instruction signal involves setup information required for establishing connection with a predetermined wireless network and is a signal for instructing to make settings based on the setup information.

10. The radio station according to claim 8,
wherein the instruction signal involves setup information required for establishing connection with the first wireless network and is a signal for instructing to make settings based on the setup information.

11. The radio station according to claim 10, further comprising:
a connection test section that tries to communicate with the other radio station through the second wireless network after the first instruction transmission section transmits the instruction signal to the other radio station.

12. The radio station according to claim 8,
wherein when the radio station receives a request signal for requesting to transmit the instruction signal from the other radio station through the second wireless network, the first instruction transmission section transmits the instruction signal.

13. The radio station according to claim 1,
wherein the synchronization authentication section conducts the authentication in conducting communications through the second wireless network only while the radio station is connected with the first wireless network.

14. A radio station to be connected to a first wireless network through an access point, comprising:
an AP storage section that stores network identification information indispensable for grouping subjects of communication in a wireless network;
an AP function section that establishes connection with a second wireless network based on the network identification information stored in the AP storage section;
a client storage section that stores client identification information used in connecting to the first wireless network;
a client function section that establishes connection with the first wireless network based on the client identification information stored in the client storage section;
an operation control section that simultaneously controls operation of the AP function section and operation of the client function section;
a connection determination section that determines whether the connection with the first wireless network by the client function section is established; and
an encryption section that conducts encryption with a predetermined cipher key, the predetermined cipher key useable to conduct communications through the second wireless network when the predetermined cipher key is used to conduct communications through the first wireless network,
wherein the client storage section has a capacity to store security information concerning the predetermined cipher key used in the communications through the first wireless network,
wherein the synchronization authentication section is configured to copy the security information stored in the client funchtion section into the AP storage section subject to the connection determination section determining the connection with the first wireless network being established, and
wherein the AP function section establishes the connection with the second wireless network based on the security information stored in the AP storage section.

15. The radio station according to claim 14,
wherein the encryption section conducts the encryption in conducting communications through the second wireless network only while the radio station is connected with the first wireless network.

16. A radio station which transmits an instruction signal through a second wireless network to an other radio station connected to a first wireless network through an access point, the other radio station comprising:
an AP storage section that stores network identification information indispensable for grouping subjects of communication in a wireless network;
an AP function section that establishes connection with the second wireless network based on the network identification information stored in the AP storage section;
a client storage section that stores client identification information used in connecting to the first wireless network;
an operation control section that simultaneously controls connection with the first wireless network based on the client identification information stored in the client storage section;
a processing execution section that executes a predetermined processing when the other radio station receives an instruction signal for instructing the other radio station to execute the predetermined processing through the second wireless network;

a connection determination section that determines whether the connection with the first wireless network is established; and a synchronization authentication section that conducts authentication by a predetermined authentication system, the predetermined authentication system configured to conduct communications through the second wireless network when the predetermined authentication system conducts communications through the first wireless network, wherein the client storage section has a capacity to store security information concerning the predetermined authentication system used in the communications through the first wireless network, wherein the synchronization authentication section is configured to copy the security information stored in the client function section into the AP storage section subject to the connection determination section determining the connection with the first wireless network being established, and wherein the AP function section establishes the connection with the section wireless network based on the security information stored in the AP storage section.

17. The radio station according to claim 16, wherein the instruction signal involves setup information required for establishing connection with the first wireless network, and the radio station comprising:

a result reception section that receives a result signal indicating a result of trying to connect to the first wireless network from the other radio station; and a notification section that reports the result indicated by the result signal.

18. The radio station according to claim 16, wherein the radio station transmits an instruction signal involving a plurality of setup information required for establishing connection with the first wireless network in order.

19. The radio station according to claim 18 comprising:

an input section with which a user of the radio station enters the plurality of setup information in order, wherein the radio station transmits the instruction signal involving the setup information every time the setup information is entered through the input section.

20. A radio station comprising a processing execution section that executes a predetermined processing when the radio station receives an instruction signal through a second wireless network from an other radio station connected to a first wireless network through an access point, the other radio station comprising:

an AP storage section that stores network identification information indispensable for grouping subjects of communication in a wireless network;

an AP function section that establishes connection with the second wireless network based on the network identification information stored in the AP storage section;

a client storage section that stores client identification information used in connecting to the first wireless network;

an operation control section that simultaneously controls connection with the first wireless network based on the client identification information stored in the client storage section;

an instruction transmission section that transmits the instruction signal for instructing the radio station to execute the predetermined processing through the second wireless network;

a connection determination section that determines whether the connection with the first wireless network is established; and a synchronization authentication section that conducts authentication by a predetermined authentication system, the predetermined authentication system configured to conduct communications through the second wireless network when the predetermined authentication system conducts communications through the first wireless network, wherein the client storage section has a capacity to store security information concerning the predetermined authentication system used in the communications through the first wireless network, wherein the synchronization authentication section is configured to copy the security information stored in the client function section into the AP storage section subject to the connection determination section determining the connection with the first wireless network being established, and wherein the AP function section establishes the connection with the second wireless network based on the security information stored in the AP storage section.

21. The radio station according to claim 20, wherein if the instruction signal involves setup information required for establishing connection with the first wireless network, the processing execution section records the setup information in the client storage section.

22. The radio station according to claim 21, further comprising:

a request signal transmission section that transmits a request signal for requesting to transmit the instruction signal through the second wireless network.

23. A storage medium storing a set of program instructions executable on a data processing device for controlling a radio station connected to a first wireless network through an access point, the program instructions comprising instructions for:

storing client identification information used in connecting to the first wireless network;

establishing a connection with the first wireless network based on the client identification information stored;

storing network identification information indispensable for grouping subjects of communication in a wireless network;

establishing a connection with a second wireless network based on the network identification information stored;

determining whether the connection with the first wireless network is established; and conducting authentication by a predetermined authentication system, the predetermined authentication system configured to conduct communications through the second wireless network when the predetermined authentication system conducts communications through the first wireless network;

wherein security information concerning the predetermined authentication system used in the communication through the first wireless network is stored, wherein the security information stored is copied and moved to where the network identification information is stored subject to the determination of whether the connection with the first wireless network is established, wherein the connection with the second wireless network is established based on the security information stored with the network identification information, and wherein establishing the connection with the first wireless network based on the client identification information stored, and establishing the connection with the second wireless network based on the network identification information stored is simultaneously controlled.

24. An operation control method of controlling a radio station connected to a first wireless network through an access point, the radio station comprising an AP storage section that stores network identification information indispensable for grouping subjects of communication in a wireless network in a peripheral device of the first wireless network; an AP function section in a peripheral device of the first wireless network that establishes connection with a second wireless network based on the network identification information stored in the AP storage section; a client storage section that stores client identification information used in connecting to the first wireless network transmitted from the second wireless network; a client function section that establishes connection with the first wireless network based on the client identification information stored in the client storage section; a connection determination section that determines whether the connection with the first wireless network by the client function section is established; and a synchronization authentication section that conducts authentication by a predetermined authentication system, the predetermined authentication system configured to conduct communications through the second wireless network when the predetermined authentication system conducts communications through the first wireless network, wherein the client storage section has a capacity to store security information concerning the predetermined authentication system used in the communications through the first wireless network, wherein the synchronization authentication section is configured to copy the security information stored in the client function section into the AP storage section subject to the connection determination section determining the connection with the first wireless network being established, and wherein the AP function section establishes the connection with the second wireless network based on the security information stored in the AP storage section, the operation control method comprising:

simultaneously controlling operation of the AP function section and operation of the client function section.

25. The radio station according to claim 14, further comprising:

a processing execution section that executes a predetermined processing when the radio station receives an instruction signal for instructing the radio station to execute the predetermined processing through the second wireless network.

26. The radio station according to claim 25, wherein if the instruction signal involves setup information required for establishing connection with the first wireless network, the processing execution section records the setup information in the client storage section.

27. The radio station according to claim 26, wherein when the setup information is recorded in the client storage section, the operation control section controls the client function section so as to try to connect to the first wireless network, and controls the AP function section so as to transmit a result signal indicating a trial result to the radio station transmitting the instruction signal.

28. The radio station according to claim 26, wherein if the instruction signal involves setup information required for establishing connection with the first wireless network, the processing execution section records the setup information in the client storage section only when the processing execution section does not execute any processing other than recording the setup information in the client storage section.

29. The radio station according to claim 25, further comprising:

a print section that prints an image in response to an instruction from the processing execution section, wherein if the instruction signal is a signal for instructing to print a predetermined image, the processing execution section instructs the print section to print the predetermined image.

30. The radio station according to claim 14, further comprising:

a first instruction transmission section that transmits an instruction signal for instructing an other radio station connected to the second wireless network to execute a predetermined processing.

31. The radio station according to claim 30, wherein the instruction signal involves setup information required for establishing connection with a predetermined wireless network and is a signal for instructing to make settings based on the setup information.

32. The radio station according to claim 30, wherein the instruction signal involves setup information required for establishing connection with the first wireless network and is a signal for instructing to make settings based on the setup information.

33. The radio station according to claim 32, further comprising:

a connection test section that tries to communicate with the other radio station through the second wireless network after the first instruction transmission section transmits the instruction signal to the other radio station.

34. The radio station according to claim 30, wherein when the radio station receives a request signal for requesting to transmit the instruction signal from the other radio station through the second wireless network, the first instruction transmission section transmits the instruction signal.

35. The radio station according to claim 14, wherein the synchronization authentication section conducts the authentication in conducting communications through the second wireless network only while the radio station is connected with the first wireless network.

36. The radio station according to claim 1, wherein the synchronization authentication section is configured, subject to the connection determination section determining the connection with the first wireless network being unestablished, to prohibit the copy of the security information stored in the client function section into the AP storage section and to delete the security information stored in the AP storage section.

37. The radio station according to claim 14, wherein the synchronization authentication section is configured, subject to the connection determination section determining the connection with the first wireless network being unestablished, to prohibit the copy of the security information stored in the client function section into the AP storage section and to delete the security information stored in the AP storage station.

* * * * *